(12) United States Patent
Burckhart et al.

(10) Patent No.: US 10,737,239 B2
(45) Date of Patent: Aug. 11, 2020

(54) ULTRAFAST HIGH SPACE-TIME-YIELD SYNTHESIS OF METAL-ORGANIC FRAMEWORKS

(71) Applicant: BASF SE, Ludwigshafen am Rhein (DE)

(72) Inventors: Julia Burckhart, Ludwigshafen am Rhein (DE); Stefan Marx, Ludwigshafen am Rhein (DE); Lena Arnold, Ludwigshafen am Rhein (DE); Claus Hofmann, Ludwigshafen am Rhein (DE); Ulrich Müller, Ludwigshafen am Rhein (DE)

(73) Assignee: BASF SE (DE)

( * ) Notice: Subject to any disclaimer, the term of this patent is extended or adjusted under 35 U.S.C. 154(b) by 0 days.

(21) Appl. No.: 15/779,314

(22) PCT Filed: Nov. 23, 2016

(86) PCT No.: PCT/EP2016/078574
§ 371 (c)(1),
(2) Date: May 25, 2018

(87) PCT Pub. No.: WO2017/089410
PCT Pub. Date: Jun. 1, 2017

(65) Prior Publication Data
US 2018/0333696 A1 Nov. 22, 2018

(30) Foreign Application Priority Data

Nov. 27, 2015 (EP) .................................... 15196733

(51) Int. Cl.
*C07F 1/08* (2006.01)
*B01J 20/22* (2006.01)
(Continued)

(52) U.S. Cl.
CPC ....... *B01J 20/226* (2013.01); *B01J 20/28033* (2013.01); *B01J 20/28042* (2013.01);
(Continued)

(58) Field of Classification Search
None
See application file for complete search history.

(56) References Cited

U.S. PATENT DOCUMENTS

| 1,332,847 A | 3/1920 | Kent |
| 3,634,331 A | 1/1972 | Neddenriep |

(Continued)

FOREIGN PATENT DOCUMENTS

| DE | 1905019 A1 | 8/1969 |
| DE | 2117479 A1 | 11/1971 |

(Continued)

OTHER PUBLICATIONS

International Preliminary Report on Patentability for PCT/EP2016/078423 dated Nov. 20, 2017 with Applicant Response.
(Continued)

*Primary Examiner* — Clinton A Brooks
(74) *Attorney, Agent, or Firm* — Faegre Drinker Biddle & Reath LLP

(57) ABSTRACT

The invention relates to a process for the preparation of metal-organic frameworks (MOFs) in form of a homogenous powder, and a process wherein the metal-organic framework is molded into shaped bodies.

16 Claims, 3 Drawing Sheets

(51) Int. Cl.
B01J 20/30 (2006.01)
B01J 20/28 (2006.01)
C07F 3/06 (2006.01)
C07F 5/06 (2006.01)

(52) U.S. Cl.
CPC ....... B01J 20/3007 (2013.01); B01J 20/3085 (2013.01); C07F 1/08 (2013.01); C07F 3/06 (2013.01); C07F 5/069 (2013.01)

(56) References Cited

U.S. PATENT DOCUMENTS

| 5,648,508 | A | 7/1997 | Yaghi |
| 6,929,679 | B2 | 8/2005 | Müller et al. |
| 7,411,081 | B2 | 8/2008 | Mueller et al. |
| 7,534,303 | B2 | 5/2009 | Mueller et al. |
| 7,847,115 | B2 | 12/2010 | Schubert et al. |
| 7,879,221 | B2 | 2/2011 | Pütter et al. |
| 7,910,732 | B2 | 3/2011 | Schubert et al. |
| 8,115,024 | B2 | 2/2012 | Schubert et al. |
| 8,163,949 | B2 | 4/2012 | Mueller et al. |
| 8,343,261 | B2 | 1/2013 | Leung et al. |
| 8,829,239 | B2 | 9/2014 | Leung et al. |
| 9,446,390 | B2 | 9/2016 | Parvulescu et al. |
| 2003/0222023 | A1 | 12/2003 | Mueller et al. |
| 2004/0081611 | A1 | 4/2004 | Muller et al. |
| 2008/0190289 | A1 | 8/2008 | Muller et al. |
| 2009/0092818 | A1* | 4/2009 | Kiener .................. B01J 20/226 428/304.4 |
| 2011/0105776 | A1 | 5/2011 | Müller et al. |
| 2015/0344364 | A1 | 12/2015 | Bazer-Bachi et al. |
| 2016/0325228 | A1 | 11/2016 | Feyen et al. |
| 2017/0037296 | A1 | 2/2017 | Kimura et al. |
| 2017/0044421 | A1 | 2/2017 | Parvulescu et al. |
| 2017/0225959 | A1 | 8/2017 | Maurer et al. |
| 2017/0246620 | A1 | 8/2017 | Parvulescu et al. |
| 2017/0275076 | A1 | 9/2017 | Edgington et al. |
| 2017/0336030 | A1 | 11/2017 | Weickert et al. |
| 2018/0022611 | A1 | 1/2018 | Feyen et al. |
| 2018/0036723 | A1 | 2/2018 | Riedel et al. |
| 2018/0134570 | A1 | 5/2018 | Maurer et al. |
| 2018/0170850 | A1 | 6/2018 | Vautravers et al. |
| 2018/0178191 | A1 | 6/2018 | Schwab et al. |
| 2018/0186648 | A1 | 7/2018 | Feyen et al. |

FOREIGN PATENT DOCUMENTS

| DE | 102005000938 A1 | 7/2006 |
| DE | 102005012087 A1 | 9/2006 |
| DE | 102005022844 A1 | 11/2006 |
| EP | 0102544 A3 | 3/1984 |
| EP | 0200260 A2 | 12/1986 |
| EP | 0389041 A1 | 9/1990 |
| EP | 0592050 A1 | 4/1994 |
| EP | 0709253 A1 | 5/1996 |
| EP | 1467811 A2 | 10/2004 |
| EP | 1674555 A1 | 6/2006 |
| JP | H03037156 A | 2/1991 |
| WO | WO-9413584 A1 | 6/1994 |
| WO | WO-9429408 A1 | 12/1994 |
| WO | WO-9519222 A1 | 7/1995 |
| WO | WO-2003035717 A1 | 5/2003 |
| WO | WO-03061820 A2 | 7/2003 |
| WO | WO-2003064030 A1 | 8/2003 |
| WO | WO-03102000 A1 | 12/2003 |
| WO | WO-2003101975 A1 | 12/2003 |
| WO | WO-2004037895 A1 | 5/2004 |
| WO | WO-200503069 A2 | 1/2005 |
| WO | WO-2005003622 A1 | 1/2005 |
| WO | WO-2005049484 A1 | 6/2005 |
| WO | WO-2006089908 A1 | 8/2006 |
| WO | WO-200909277 A1 | 1/2009 |
| WO | WO-2009115513 A1 | 9/2009 |
| WO | WO-2010012715 A1 | 2/2010 |
| WO | WO-2012156436 A1 | 11/2012 |
| WO | WO-2013160683 A1 | 10/2013 |
| WO | WO-2014041284 A1 | 3/2014 |
| WO | WO-2014191725 A1 | 12/2014 |
| WO | WO-2015123530 A1 | 8/2015 |
| WO | WO-2015123531 A1 | 8/2015 |
| WO | WO-201605100 A1 | 1/2016 |
| WO | WO-2016024201 A1 | 2/2016 |
| WO | WO-2016/116406 A1 | 7/2016 |
| WO | WO-2016135133 A1 | 9/2016 |
| WO | WO-2016180809 A1 | 11/2016 |
| WO | WO-2017085049 A1 | 5/2017 |
| WO | WO-2017089344 A1 | 6/2017 |

OTHER PUBLICATIONS

International Preliminary Report on Patentability for PCT/EP2016/078574 dated Nov. 20, 2017 with Applicant Response.
International Search Report for PCT/EP2016/078423 dated Mar. 1, 2017.
International Search Report for PCT/EP2016/078574 dated Feb. 24, 2017.
Written Opinion of the International Searching Authority for PCT/EP2016/078423 dated Mar. 1, 2017.
Written Opinion of the International Searching Authority for PCT/EP2016/078574 dated Feb. 24, 2017.
U.S. Appl. No. 61/939,889.
U.S. Appl. No. 61/939,895.
U.S. Appl. No. 61/939,896.
U.S. Appl. No. 61/990,490.
U.S. Appl. No. 62/081,243.
U.S. Appl. No. 61/990,756.
U.S. Appl. No. 61/990,773.
U.S. Appl. No. 62/077,938.
U.S. Appl. No. 62/077,940.
U.S. Appl. No. 15/521,924, filed Apr. 26, 2017, Teles et al.
U.S. Appl. No. 15/744,324, filed Jan. 12, 2018, Parvulescu et al.
U.S. Appl. No. 15/752,991, filed Feb. 15, 2018, Mueller et al.
Abedi, S., et al., "Mechanochemical synthesis of isoreticular metal-organic frameworks and comparative study of their potential for nitrobenzene sensing", New J. Chem., 2015, vol. 39, pp. 5108-5111.
Bisht, K., et al., Rapid mechanochemical protocol for isostructural polycatenated coordination polymers [M(BrIP)(BIX)] (M = Co(II), Zn(II)), Polyhedron, 2015, vol. 87, pp. 71-78.
Chun, H., et al., "Targeted Synthesis of a Prototype MOF Based on $Zn_4(O)(O_2C)_6$ Units and a Nonlinear Dicarboxylate Ligand", Inorganic Chemistry, 2009, vol. 48, No. 2, pp. 417-419.
Crawford, D., et al., "Synthesis by extrusion: continuous, large-scale peparation of MOFs using little or no solvent", Chemical Science, 2015, vol. 6, pp. 1645-1649.
Friscic, T., "Mechanochemical Approaches to Metal-Organic Frameworks", Encyclopedia of Inorganic and Bioinoranic Chemistry, 2014, pp. 1-19.
James, S. L., et al., "Mechnochmistry: opportunities for new and cleaner synthesis", Chem. Soc. Rev., 2012, vol. 41, pp. 413-447.
Klimakow, M., et al., "Characterization of mechanochemically synthesized MOFs", Microporous and Mesoporous Materials, 2012, vol. 154, pp. 113-118.
Klimakow, M., et al., "Mechanochemical Synthesis of Metal-Organic Frameworks: A Fast and Facile Approach toward Quantitative Yields and High Specific Surface Areas", Chemistry of Materials, 2010, vol. 22, pp. 5216-5221.
Ma, X., et al., "Better understanding of mechanochemical reactions: Raman monitoring reveals surprisingly simple 'pseudo-fluid' model for a ball milling reaction", Chem. Commun., 2014, vol. 50, pp. 1585-1587.
Pilloni, M., et al., et al., "Liquid-assited mechanochemical sysnthesis of an iron carboxylate Metal Organic Framework and its evaluation in diesel fuel desulfurization", Microporous and Mesoporous Materials, 2015, vol. 213, pp. 14-21.
Sing, K.S.W., et al., "Reporting Physisorption Data for Gas/Solid Systems with Special Reference to the Determination of Surface Area and Porosity", Pure & Applied Chemistry, 1985, vol. 57, No. 4, pp. 603-619.

(56) References Cited

OTHER PUBLICATIONS

"Ullmann'S Encyklopädie der technischen Chemie", 2014, vol. 50, pp. 295-300.

Yang, H., et al., "Study of mechanochemical synthesis in the formation of the metal-organic framewoek $Cu_3(BTC)_2$ for hydrogen storage", Microporous and Mesoporous Materials, 2011, vol. 143, pp. 37-45.

\* cited by examiner

ULTRAFAST HIGH SPACE-TIME-YIELD SYNTHESIS OF METAL-ORGANIC FRAMEWORKS

CROSS-REFERENCE TO RELATED APPLICATIONS

This application is a national stage application (under 35 U.S.C. § 371) of PCT/EP2016/078574, filed Nov. 23, 2016, which claims benefit of European Application No. 15196733.8, filed Nov. 27, 2015, both of which are incorporated herein by reference in their entirety.

The invention relates to a process for the preparation of metal-organic frameworks (MOFs) in form of a homogenous powder, and a process wherein the metal-organic framework is molded into shaped bodies.

Porous metal-organic frameworks are known in the prior art and form an interesting class of substances, which can be an alternative to zeolites, activated carbons and other porous materials for various applications.

Numerous processes have been developed for preparing such porous metal-organic frameworks. Typically, a metal salt is reacted with an at least bidentate organic compound, for example a dicarboxylic acid, in a suitable solvent under solvothermal conditions.

Conventional methods for the preparation of metal-organic frameworks usually comprise the step of mixing the starting materials—metal source, organic linker and solvent, precipitating the product, filtration and washing of the framework material followed by a drying step and/or a sieving step or the like and optionally subsequent shaping.

US 2011/0105776 A1, U.S. Pat. No. 7,910,732 B2 and U.S. Pat. No. 7,879,221 relate to methods for the electrochemically preparation of crystalline, porous metal-organic framework materials comprising at least one at least bidentate organic compound coordinately bond to at least one metal ion.

U.S. Pat. No. 7,411,081 describes the preparation of an organometallic framework material comprising the reaction of at least one metal salt with at least one at least bidentate organic compound in the presence of an aqueous solvent system and at least one base.

U.S. Pat. No. 7,847,115 relates to the preparation of porous metal-organic frameworks in a liquid phase in the presence of a non-aqueous solvent, for example diethylformamide, in the presence of and/or with liberation of water.

A method for producing metal-organic frameworks, for example Cu-1,3,5-benzenetricarboxylic acid is disclosed in U.S. Pat. No. 8,115,024. The preparation comprises reacting a mixture of at least one copper compound, for example copper sulfate with at least one at least bidentate compound, for example 1,3,5-benzenetricarboxylic acid in the liquid phase, wherein the solvent system comprises for example ethylene glycol.

These preparative processes frequently do not provide a basis for the production of relatively large amounts of the metal-organic framework.

Moreover, many of the known methods require a significant excess of one of the reagents, large amounts of the solvent and/or high energy consumption for certain preparation and reprocessing steps, which are necessary to remove byproducts or the like.

It is therefore advantageous to prepare the metal-organic framework in a process wherein the conversion of the starting materials is almost quantitative and wherein the formation of disturbing byproducts and/or the use of relatively high amounts of the solvent can be avoided.

WO 2014/191725 A1 describes a process for the preparation of a metal-organic compound, for example Cu-1,3,5-benzenetricarboxylate (HKUST-1) or Zn-2-methylimidazolate (ZIF-8), comprising at least the steps of providing at least one metal in ionic form and at least one organic ligand, admixing those reactants, optionally in the presence of a solvent, for example methanol, under conditions of prolonged and sustained pressure and shear sufficient to synthesize the metal-organic framework. The necessary pressure and shear is preferably applied by an extrusion process.

Mechanochemical syntheses are reactions which are conducted by grinding solid reactants together without solvent or with only small amounts of solvents. General aspects of the mechanochemical synthesis of a multitude of materials and compounds, for example inorganic materials, such as alloys, oxides, halides, sulfides and nitrides; cocrystals, such as pharmaceutical cocrystals; organic materials; metal complexes and molecular main group compounds are summarized by S. L. James et al. (Chem. Soc. Rev. 2012, 41, 413). Said document refers also to the mechanochemical preparation of porous metal-organic frameworks, respectively coordination polymers by different mechanochemical methodologies: neat grinding, liquid-assisted grinding (LAG) or ion- and liquid-assisted grinding (ILAG).

I. James et al. (Chem. Sci., 2015, 6, 1645) relates to the continuous, large-scale syntheses of metal-organic framework materials, wherein little or no solvent is used. The document describes the preparation of $Cu_3(BTC)_2$ from copper (II) hydroxide and benzene-1,3,5-tricarboxylic acid by solvent-assisted twin-screw extrusion (TSE), wherein the solvent is methanol. The synthesis of Zn(2-methylimidazolate)$_2$ from $[Zn_2(CO_2)_2][Zn_3(OH)_6]$ and 2-methylimidazole is conducted by solvent-free twin screw extrusion or solvent-free single screw extrusion.

M. Klimakow et al. (Chem. Mater., 2010, 22, 5216) relates to the preparation of the MOF $Cu_3(BTC)_2$ in a ball mill via liquid assisted grinding of fine powders of copper acetate monohydrate and 1,3,5-benzenetricarboxylic acid in the molar ratio of 3:2 and a small amount of ethanol.

Further solvent-free syntheses of metal-organic framework materials or syntheses using minimal amounts of a solvent (for example LAG) are described by H. Yang et al. (Microporous and Mesoporous Materials, 2011, 143, 37), M. Klimakow et al. (Microporous and Mesoporous Materials, 2012, 154, 113), S. Abedi et al. (New. J. Chem. 2015, 39, 5108), K. K. Bisht et al. (polyhedron, 2015, 87, 71), M. Pilloni et al. (Microporous and Mesoporous Materials, 2015, 213, 14), X. Ma et al. (Chem. Commun. 2014, 50, 1585) and H. Chun (Inorg. Chem. 2009, 48 (2), 417).

In many cases those processes also do not provide a basis for the production of relatively large amounts of a metal-organic framework material, either because the upscale of the reactions is problematic, for example the upscale of reactions which are carried out in ball-mills, and/or because a multitude of different process steps or the repetition of one or more process steps is required to obtain the product in a satisfactory yield. The latter often causes a relatively high energy and time input.

In other cases, for example in conventional batch syntheses, the solvent has to be removed after the formation of the MOF by filtration and a subsequent drying step. Due to the drying step, wherein large amounts of the solvent has to be removed, the metal-organic framework material often is then obtained in the form of an inhomogeneous powder containing large agglomerates which made further processing steps, for example a sieving step necessary.

Moreover, despite the preparative processes known in the prior art, there is a need for new processes in which the disadvantages of the known methods are at least partly overcome and, in particular, allow the preparation of the framework in the form of a homogenous powder having good processing properties in relatively large amounts, in particular in very good absolute yields (based on a starting material) and yields on a time basis (space-time yield).

It is therefore an object of the present invention to provide such a process.

This objective is achieved by a process for the preparation of a metal-organic framework, wherein the at least one metal-organic framework comprises at least one at least bidentate organic compound coordinated to at least one metal ion, comprising the steps a) preparation of a dry composition by mixing at least one metal salt corresponding to the at least one metal ion and at least one at least bidentate organic compound or a salt thereof;

b) addition of a solvent to the dry composition of step a), wherein the solvent comprises 25 to 75% by volume of at least one alcohol and 25 to 75% by volume of water, wherein the given amounts are based on the total volume of the solvent; and c) mixing of the solvent-containing composition of step b) to obtain the metal-organic framework in the form of a homogenous powder.

It has surprisingly been found that high space-time yields can be achieved when the above mentioned features of the process of the invention are adhered to. In particular, it is surprising that the metal-organic framework can be obtained not only virtually quantitatively, but also with very good specific surface areas. It has also been found that the MOF is obtained in the form of a homogenous powder which has excellent processing properties without conducting further purification or other reprocessing steps.

Metal-Organic Framework

The metal-organic framework according to the present invention comprises pores, in particular micropores and/or mesopores. Micropores are defined as pores having a diameter of 2 nm or less and mesopores are defined by a diameter in the range from 2 to 50 nm, in each case in accordance with the definition given in Pure & Applied Chem. 57 (1983), 603-619, in particular on page 606. The presence of micropores and/or mesopores can be checked by means of sorption measurements, with these measurements determining the uptake capacity of the MOFs for nitrogen at 77 Kelvin (Langmuir Method) in accordance with DIN 66131: 1993-07 and/or DIN 66134:1998-2 or according to the BET-Method (DIN ISO 9277:2003-05).

The specific surface area, determined according to BET (DIN ISO 9277:2003-05) by $N_2$ adsorption, of a metal organic framework in powder form is preferably more than 100 $m^2/g$, more preferably above 300 $m^2/g$, more preferably more than 500 $m^2/g$, even more preferably more than 800 $m^2/g$, even more preferably more than 1000 $m^2/g$ and particularly preferably more than 1200 $m^2/g$.

The metal-organic framework according to the invention comprises at least one metal-ion.

The metal ion in the framework according to the present invention is preferably an ion of a metal selected from groups Ia, IIa, IIIa, IVa to VIIIa and Ib to VIb. Particular preference is given to ions of Mg, Ca, Sr, Ba, Sc, Y, Ln, Ti, Zr, Hf, V, Nb, Ta, Cr, Mo, W, Mn, Re, Fe, Ro, Os, Co, Rh, Ir, Ni, Pd, Pt, Ag, Au, Zn, Cd, Hg, Al, Ga, In, Tl, Si, Ge, Sn, Pb, As, Sb and Bi, wherein Ln represents lanthanides.

Lanthanides are La, Ce, Pr, Nd, Pm, Sm, En, Gd, Tb, Dy, Ho, Er, Tm, Yb.

As regards the ions of these elements, particular mention may be made of $Mg^{2+}$, $Ca^{2+}$, $Sr^{2+}$, $Ba^{2+}$, $Sc^{3+}$, $Y^{3+}$, $Ln^{3+}$, $Ti^{4+}$, $Zr^{4+}$, $Hf^{4+}$, $V^{4+}$, $V^{3+}$, $V^{2+}$, $Nb^{3+}$, $Ta^{3+}$, $Cr^{3+}$, $Mo^{3+}$, $W^{3+}$, $Mn^{3+}$, $Mn^{2+}$, $Re^{3+}$, $Re^{2+}$, $Fe^{3+}$, $Fe^{2+}$, $Ru^{3+}$, $Ru^{2+}$, $Os^{3+}$, $Os^{2+}$, $Co^{3+}$, $Co^{2+}$, $Rh^{2+}$, $Rh^+$, $Ir^{2+}$, $Ir^+$, $Ni^{2+}$, $Ni^+$, $Pd^{2+}$, $Pd^+$, $Pt^{2+}$, $Pt^+$, $Cu^{2+}$, $Cu^+$, $Ag^+$, $Au^+$, $Zn^{2+}$, $Cd^{2+}$, $Hg^{2+}$, $Al^{3+}$, $Ga^{3+}$, $In^{3+}$, $Tl^{3+}$, $Si^{4+}$, $Si^{2+}$, $Ge^{4+}$, $Ge^{2+}$, $Sn^{4+}$, $Sn^{2+}$, $Pb^{4+}$, $Pb^{2+}$, $As^{5+}$, $As^{3+}$, $As^+$, $Sb^{5+}$, $Sb^{3+}$, $Sb^+$, $Bi^{5+}$, $Bi^{3+}$ and $Bi^+$.

Preference is given to the ions of Zn, Al, Mg, Cu, Mn, Fe, Co, Ni, Ti, Zr, Y, Sc, V, In, Ca, Cr, Mo, W, Ln. Preferably the at least one metal ion is an ion of Cu, Zn, Al, Mg, Zr, and Fe. Particular preference is given to the ions of Cu, Zn, and Al, preferably $Cu^{2+}$, $Zn^{2+}$ and $Al^{3+}$, very particular preference is given to the ions of Zn and Cu, especially preferred are $Zn^{2+}$ and $Cu^{2+}$.

In the process according to the invention the metal ion is used in the form of at least one metal salt corresponding to the at least one metal ion.

Preferably at least one anion of the at least one metal salt is oxide, hydroxide, acetate, chloride, carbonate, sulfate, nitrate, or a mixture of two or more thereof, preferably hydroxide, oxide, carbonate, sulfate or a mixture thereof.

In a preferred embodiment the metal salt is copper hydroxide ($Cu(OH)_2$), zinc carbonate ($ZnCO_3$), basic zinc carbonate $[Zn(CO_3)]_2[Zn(OH)_2]_3$, aluminum sulfate $Al_2(SO_4)_3$, or hydrates thereof, or any metal hydroxide, particularly preferred are ($Cu(OH)_2$), basic zinc carbonate $[Zn(CO_3)]_2[Zn(OH)_2]_3$, aluminum sulfate $Al_2(SO_4)_3$, or hydrates thereof.

The term "at least bidentate organic compound" refers to an organic compound which comprises at least one functional group which is able to form at least two coordinate bonds to a given metal ion and/or form a coordinate bond to each of two or more, preferably two, metal atoms. The at least one at least bidentate organic compound can be used as such or in the form of a salt thereof, preferably the organic compound is used as such.

As functional groups via which the abovementioned coordinate bonds can be formed, mention may be made by way of example of, in particular: —$CO_2H$, —$CS_2H$, —$NO_2$, —$B(OH)_2$, —$SO_3H$, —$Si(OH)_3$, —$Ge(OH)_3$, —$Sn(OH)_3$, —$Si(SH)_4$, —$Ge(SH)_4$, —$Sn(SH)_3$, —POSH, —$AsO_3H$, —$AsO_4H$, —$P(SH)_3$, —$As(SH)_3$, —$CH(RSH)_2$, —$C(RSH)_3$—$CH(RNH_2)_2$—$C(RNH_2)_3$, —$CH(ROH)_2$, —$C(ROH)_3$, —$CH(RCN)_2$, —$C(RCN)_3$, where R is preferably, for example, an alkylene group having 1, 2, 3, 4 or 5 carbon atoms, for example a methylene, ethylene, n-propylene, i-propylene, n-butylene, i-butylene, tert-butylene or n-pentylene group, or an aryl group comprising 1 or 2 aromatic rings, for example 2 $C_6$ rings, which may, if appropriate, be fused and may, independently of one another, be appropriately substituted by in each case at least one substituent and/or may, independently of one another, comprise in each case at least one heteroatom, for example N, O and/or S. In likewise preferred embodiments, mention may be made of functional groups in which the abovementioned radical R is not present. In this regard, mention may be made of, inter alia, —$CH(SH)_2$, —$C(SH)_3$, —$CH(NH_2)_2$, —$C(NH_2)_3$, —$CH(OH)_2$, —$C(OH)_3$, —$CH(CN)_2$ or —$C(CN)_3$.

However, the functional groups can also be heteroatoms of a heterocycle. Particular mention may here be made of nitrogen atoms.

The at least two functional groups can in principle be bound to any suitable organic compound as long as it is ensured that the organic compound comprising these functional groups is capable of forming the coordinate bond and of producing the framework.

The organic compounds which comprise at least two functional groups are preferably derived from a saturated or unsaturated aliphatic compound or an aromatic compound or a both aliphatic and aromatic compound.

The aliphatic compound or the aliphatic part of the both aliphatic and aromatic compound can be linear and/or branched and/or cyclic, with a plurality of rings per compound also being possible. The aliphatic compound or the aliphatic part of the both aliphatic and aromatic compound more preferably comprises from 1 to 15, more preferably from 1 to 14, more preferably from 1 to 13, more preferably from 1 to 12, more preferably from 1 to 11 and particularly preferably from 1 to 10, carbon atoms, for example 1, 2, 3, 4, 5, 6, 7, 8, 9 or 10 carbon atoms. Particular preference is here given to, inter alia, methane, adamantane, acetylene, ethylene or butadiene.

The aromatic compound or the aromatic part of the both aromatic and aliphatic compound can have one or more rings, for example two, three, four or five rings, with the rings being able to be present separately from one another and/or at least two rings being able to be present in fused form. The aromatic compound or the aromatic part of the both aliphatic and aromatic compound particularly preferably has one, two or three rings, with particular preference being given to one or two rings. Furthermore, the rings of said compound can each comprise, independently of one another, at least one heteroatom such as N, O, S, B, P, Si, Al, preferably N, O and/or S. More preferably, the aromatic compound or the aromatic part of the both aromatic and aliphatic compound comprises one or two $C_6$ rings; in the case of two rings, they can be present either separately from one another or in fused form. Aromatic compounds of which particular mention may be made are benzene, naphthalene and/or biphenyl and/or bipyridyl and/or pyridyl.

The at least bidentate organic compound is more preferably an aliphatic or aromatic, acyclic or cyclic hydrocarbon which has from 1 to 18, preferably from 1 to 10 and in particular 6, carbon atoms and in addition has exclusively 2, 3 or 4 carboxyl groups as functional groups.

For example, the at least bidentate organic compound is derived from a dicarboxylic acid such as oxalic acid, succinic acid, tartaric acid, 1,4-butanedicarboxylic acid, 1,4-butenedicarboxylic acid, 4-oxopyran-2,6-dicarboxylic acid, 1,6-hexanedicarboxylic acid, decanedicarboxylic acid, 1,8-heptadecanedicarboxylic acid, 1,9-heptadecanedicarboxylic acid, heptadecanedicarboxylic acid, acetylenedicarboxylic acid, 1,2-benzenedicarboxylic acid, 1,3-benzenedicarboxylic acid, 2,3-pyridinedicarboxylic acid, pyridine-2,3-dicarboxylic acid, 1,3-butadiene-1,4-dicarboxylic acid, 1,4-benzenedicarboxylic acid, p-benzenedicarboxylic acid, imidazole-2,4-dicarboxylic acid, 2-methylquinoline-3,4-dicarboxylic acid, quinoline-2,4-dicarboxylic acid, quinoxaline-2,3-dicarboxylic acid, 6-chloroquinoxaline-2,3-dicarboxylic acid, 4,4'-diaminophenylmethane-3,3'-dicarboxylic acid, quinoline-3,4-dicarboxylic acid, 7-chloro-4-hydroxyquinoline-2,8-dicarboxylic acid, diimidedicarboxylic acid, pyridine-2,6-dicarboxylic acid, 2-methylimidazole-4,5-dicarboxylic acid, thiophene-3,4-dicarboxylic acid, 2-isopropylimidazole-4,5-dicarboxylic acid, tetrahydropyran-4,4-dicarboxylic acid, perylene-3,9-dicarboxylic acid, perylenedicarboxylic acid, Pluriol E 200-dicarboxylic acid, 3,6-dioxaoctanedicarboxylic acid, 3,5-cyclohexadiene-1,2-dicarboxylic acid, octadicarboxylic acid, pentane-3,3-dicarboxylic acid, 4,4'-diamino-1,1'-biphenyl-3,3'-dicarboxylic acid, 4,4'-diaminobiphenyl-3,3'-dicarboxylic acid, benzidine-3,3'-dicarboxylic acid, 1,4-bis(phenylamino)benzene-2,5-dicarboxylic acid, 1,1'-binaphthyldicarboxylic acid, 7-chloro-8-methylquinoline-2,3-dicarboxylic acid, 1-anilinoanthraquinone-2,4'-dicarboxylic acid, polytetrahydrofuran-250-dicarboxylic acid, 1,4-bis(carboxymethyl)piperazine-2,3-dicarboxylic acid, 7-chloroquinoline-3,8-dicarboxylic acid, 1-(4-carboxy)phenyl-3-(4-chloro)phenylpyrazoline-4,5-dicarboxylic acid, 1,4,5,6,7,7-hexachloro-5-norbornene-2,3-dicarboxylic acid, phenylindanedicarboxylic acid, 1,3-dibenzyl-2-oxoimidazolidine-4,5-dicarboxylic acid, 1,4-cyclohexanedicarboxylic acid, naphthalene-1,8-dicarboxylic acid, 2-benzoylbenzene-1,3-dicarboxylic acid, 1,3-dibenzyl-2-oxoimidazolidine-4,5-cis-dicarboxylic acid, 2,2'-biquinoline-4,4'-dicarboxylic acid, pyridine-3,4-dicarboxylic acid, 3,6,9-trioxa-undecanedicarboxylic acid, hydroxybenzophenonedicarboxylic acid, Pluriol E 300-dicarboxylic acid, Pluriol E 400-dicarboxylic acid, Pluriol E 600-dicarboxylic acid, pyrazole-3,4-dicarboxylic acid, 2,3-pyrazinedicarboxylic acid, 5,6-dimethyl-2,3-pyrazinedicarboxylic acid, (bis(4-aminophenyl)ether)diimidedicarboxylic acid, 4,4'-diaminodiphenylmethanediimidedicarboxylic acid, (bis(4-aminophenyl) sulfone) diimidedicarboxylic acid, 1,4-naphthalenedicarboxylic acid, 2,6-naphthalenedicarboxylic acid, 1,3-adamantanedicarboxylic acid, 1,8-naphthalenedicarboxylic acid, 2,3-naphthalenedicarboxylic acid, 8-methoxy-2,3-naphthalenedicarboxylic acid, 8-nitro-2,3-naphthalenecarboxylic acid, 8-sulfo-2,3-naphthalenedicarboxylic acid, anthracene-2,3-dicarboxylic acid, 2',3'-diphenyl-p-terphenyl-4,4"-dicarboxylic acid, (diphenyl ether)-4,4'-dicarboxylic acid, imidazole-4,5-dicarboxylic acid, 4(1H)-oxothiochromene-2,8-dicarboxylic acid, 5-tert-butyl-1,3-benzenedicarboxylic acid, 7,8-quinolinedicarboxylic acid, 4,5-imidazoledicarboxylic acid, 4-cyclohexene-1,2-dicarboxylic acid, hexatriacontanedicarboxylic acid, tetradecanedicarboxylic acid, 1,7-heptadicarboxylic acid, 5-hydroxy-1,3-benzenedicarboxylic acid, 2,5-dihydroxy-1,4-dicarboxylic acid, pyrazine-2,3-dicarboxylic acid, furan-2,5-dicarboxylic acid, 1-nonene-6,9-dicarboxylic acid, eicosenedicarboxylic acid, 4,4'-dihydroxydiphenylmethane-3,3'-dicarboxylic acid, 1-amino-4-methyl-9,10-dioxo-9,10-dihydroanthracene-2,3-dicarboxylic acid, 2,5-pyridinedicarboxylic acid, cyclohexene-2,3-dicarboxylic acid, 2,9-dichlorofluorubin-4,11-dicarboxylic acid, 7-chloro-3-methylquinoline-6,8-dicarboxylic acid, 2,4-dichlorobenzophenone-2',5'-dicarboxylic acid, 1,3-benzenedicarboxylic acid, 2,6-pyridinedicarboxylic acid, 1-methylpyrrole-3,4-dicarboxylic acid, 1-benzyl-1H-pyrrole-3,4-dicarboxylic acid, anthraquinone-1,5-dicarboxylic acid, 3,5-pyrazoledicarboxylic acid, 2-nitrobenzene-1,4-dicarboxylic acid, heptane-1,7-dicarboxylic acid, cyclobutane-1,1-dicarboxylic acid, 1,14-tetradecanedicarboxylic acid, 5,6-dehydronorbornane-2,3-dicarboxylic acid, 5-ethyl-2,3-pyridinedicarboxylic acid or camphordicarboxylic acid.

The at least bidentate organic compound is even more preferably one of the dicarboxylic acids mentioned above by way of example as such.

For example, the at least bidentate organic compound can be derived from a tricarboxylic acid such as 2-hydroxy-1,2,3-propanetricarboxylic acid, 7-chloro-2,3,8-quinolinetricarboxylic acid, 1,2,3-, 1,2,4-benzenetricarboxylic acid, 1,2,4-butanetricarboxylic acid, 2-phosphono-1,2,4-butanetricarboxylic acid, 1,3,5-benzenetricarboxylic acid, 1-hydroxy-1,2,3-propanetricarboxylic acid, 4,5-dihydro-4,5-dioxo-1H-pyrrolo[2,3-F]quinoline-2,7,9-tricarboxylic acid, 5-acetyl-3-amino-6-methylbenzene-1,2,4-tricarboxylic acid, 3-amino-5-benzoyl-6-methylbenzene-1,2,4-tricarboxylic acid, 1,2,3-propanetricarboxylic acid or aurintricarboxylic acid.

The at least bidentate organic compound is even more preferably derived from one of the tricarboxylic acids mentioned above by way of example as such.

Examples of an at least bidentate organic compound derived from a tetracarboxylic acid are 1,1-dioxidoperylo[1,12-BCD]thiophene-3,4,9,10-tetracarboxylic acid, perylenetetracarboxylic acids such as perylene-3,4,9,10-tetracarboxylic acid or (perylene 1,12-sulfone)-3,4,9,10-tetracarboxylic acid, butanetetracarboxylic acids such as 1,2,3,4-butanetetracarboxylic acid or meso-1,2,3,4-butanetetracarboxylic acid, decane-2,4,6,8-tetracarboxylic acid, 1,4,7,10,13,16-hexaoxacyclooctadecane-2,3,11,12-tetracarboxylic acid, 1,2,4,5-benzenetetracarboxylic acid, 1,2,11,12-dodecanetetracarboxylic acid, 1,2,5,6-hexanetetracarboxylic acid, 1,2,7,8-octanetetracarboxylic acid, 1,4,5,8-naphthalenetetracarboxylic acid, 1,2,9,10-decanetetracarboxylic acid, benzophenonetetracarboxylic acid, 3,3',4,4'-benzophenonetetracarboxylic acid, tetrahydrofurantetracarboxylic acid or cyclopentanetetracarboxylic acids such as cyclopentane-1,2,3,4-tetracarboxylic acid.

The at least bidentate organic compound is even more preferably one of the tetracarboxylic acids mentioned above by way of example as such.

In a preferred embodiment, the at least one at least bidentate organic compound is thus derived from a dicarboxylic, tricarboxylic or tetracarboxylic acid or is such an acid.

Preference is also given to using optionally at least monosubstituted aromatic dicarboxylic, tricarboxylic or tetracarboxylic acids which have one, two, three, four or more rings and in which each of the rings can comprise at least one heteroatom, with two or more rings being able to comprise identical or different heteroatoms. For example, preference is given to one-ring dicarboxylic acids, one-ring tricarboxylic acids, one-ring tetracarboxylic acids, two-ring dicarboxylic acids, two-ring tricarboxylic acids, two-ring tetracarboxylic acids, three-ring dicarboxylic acids, three-ring tricarboxylic acids, three-ring tetracarboxylic acids, four-ring dicarboxylic acids, four-ring tricarboxylic acids and/or four-ring tetracarboxylic acids. Suitable heteroatoms are, for example, N, O, S, B, P and preferred heteroatoms here are N, S and/or O. Suitable substituents which may be mentioned in this respect are, inter alia, —OH, a nitro group, an amino group or an alkyl or alkoxy group.

For the purposes of the present invention, the term "derived" means that the dicarboxylic, tricarboxylic or tetracarboxylic acid can be present in partially deprotonated or fully deprotonated form in the framework. Furthermore, the dicarboxylic, tricarboxylic or tetracarboxylic acid can comprise a substituent or, independently of one another, a plurality of substituents. Examples of such substituents are —OH, —NH$_2$, —OCH$_3$, —CH$_3$, —NH(CH$_3$), —N(CH$_3$)$_2$, —CN and halides. Furthermore, the term "derived" means, for the purposes of the present invention, that the dicarboxylic, tricarboxylic or tetracarboxylic acid can also be present in the form of the corresponding sulfur analogues. Sulfur analogues are the functional groups —C(=O)SH and its tautomer and C(=S)SH, which can be used instead of one or more carboxylic acid groups. Furthermore, the term "derived" means, for the purposes of the present invention, that one or more carboxylic acid fractions can be replaced by a sulfonic acid group (—SO$_3$H). Furthermore, it is likewise possible for a sulfonic acid group to be present in addition to the 2, 3 or 4 carboxylic acid functions.

Preferred monocarbocylic acids as at least bidentate compound in which a coordinate bond is formed via the carboxylic functional group are formates and mixed formates/actetates especially in form of Mg— and Li-MOFs (WO 2009/115513 A1 and WO 2010/012715 A1).

In another preferred embodiment the at least one at least bidentate organic compound is a monocyclic, bicyclic or polycyclic ring system which is derived from at least one heterocycle selected from the group consisting of pyrrole, alpha-pyridone and gamma-pyridone. All these three heterocycles have a ring nitrogen which in at least one limiting structure bears a hydrogen atom which can be split off. It is thus possible to deprotonate pyrrole, alpha-pyridone or gamma-pyridone. This forms a negative charge which can at least partly balance the positive charge of the at least one metal ion.

For the purposes of the present invention, the term "derive" in this context means that the monocyclic, bicyclic or polycyclic ring system has at least one substructure which corresponds to pyrrole, alpha-pyridone or gamma-pyridone. Furthermore, two or all three heterocycles can also be present as substructure in the ring system.

For the purposes of the present invention, the term "derive" also means that the three abovementioned heterocycles can occur not in neutral form but, if appropriate, also as anion or cation.

Furthermore, it should be noted that at least one of the heterocycles which represents a substructure of the ring system may be deprotonated during the reaction.

Furthermore, for the purposes of the present invention, the term "derive" means that the substructure of at least one of the three heterocycles can bear substituents and one or more ring carbons can be replaced by a heteroatom.

Of course, the ring system can also be one of the heterocycles pyrrole, alpha-pyridone or gamma-pyridone itself or the ring system can likewise be made up of substructures which are selected exclusively from the group consisting of pyrrole, alpha-pyridone and gamma-pyridone. In this case too, the above-described modifications are possible.

Finally, it should be noted that at least one hydrogen which in at least one limiting structure is not the hydrogen bound to said nitrogen is replaced by a bond by means of which the respective heterocycle is bound to the remainder of the ring system.

If a monocyclic ring system is present, this is derived from pyrrole or alpha-pyridone or gamma-pyridone.

However, the ring system can also be a bicyclic ring system. This is the case when, for example, two rings which are joined to one another via a covalent single bond or via a group R are present in the ring system. Here, one ring has to be derived from pyrrole, alpha-pyridone or gamma-pyridone.

R can be —O—, —NH—, —S—, —N=N— or an aliphatic branched or unbranched saturated or unsaturated hydrocarbon which has from 1 to 4 carbon atoms and may be interrupted by one or more atoms or functional groups selected independently from the group consisting of —O—, —NH—, —S— and —N=N—.

Furthermore, the bicyclic ring system can be a fused ring system.

Examples are, in particular, benzo-fused derivatives derived from pyrrole, alpha-pyridone and gamma-pyridone.

In addition, the bicyclic ring system can be a bridged ring system.

The ring system can likewise be a polycyclic ring system which has, for example, 3, 4 or more rings. Here, the rings can be joined via a covalent single bond and/or a group R and/or be fused and/or be present as a bridged ring system.

The ring system has at least two ring nitrogens. Here, at least one of the two ring nitrogens is that nitrogen which is present in the ring derived from pyrrole, alpha-pyridone or gamma-pyridone. In addition, at least one further ring nitrogen has to be present. If the ring system is one which has more than one ring, the at least second ring nitrogen can also be present in the ring derived from pyrrole, alpha-pyridone or gamma-pyridone or, if the at least one further ring is not derived from one of these three heterocycles, may be located in this ring.

The at least two ring nitrogens are preferably present in one ring of the ring system.

In this case, the ring is derived from pyrazole, imidazole, pyridazin-2-one or pyrimidin-2-one or pyrimidin-4-one. Preference is given to imidazole.

In addition to the two ring nitrogens, further ring nitrogens can be present. For example, the ring system can have 3, 4, 5 or more ring nitrogens.

If more than two ring nitrogens are present, all ring nitrogens can be present in one ring of the ring system or can be distributed over more than one ring up to all rings of the ring system.

If, for example, three ring nitrogens are present, these are also preferably present in the ring which is derived from pyrrole, alpha-pyridone or gamma-pyridone. The resulting substructure of the ring can then be derived, for example, from a triazole, such as 1,2,3-triazole or 1,2,4-triazole.

In addition, the ring system can have further heteroatoms in the ring. These can be, for example, oxygen or sulfur. However, preference is given to no further heteroatoms in addition to nitrogen being present.

If the ring system has more than one ring, this ring can be saturated or unsaturated. The at least one further ring preferably has an at least partially conjugated double bond system or is aromatic in nature.

The ring system can be unsubstituted.

The ring system can also have one or more substituents. If a plurality of substituents is present, these can be identical or different. Preference is given to substituted imidazoles.

The substituents bound to the ring system can be halogen, $C_{1-6}$-alkyl, phenyl, $NH_2$, $NH(C_{1-6}$-alkyl), $N(C_{1-6}$-alkyl)$_2$, OH, Ophenyl or $OC_{1-6}$-alkyl.

If at least one of the abovementioned substituents of the ring system is a $C_{1-6}$-alkyl or phenyl, these can likewise be unsubstituted or bear one or more substituents. When a plurality of substituents is present, it is also possible here for them to be identical or different. These are selected from the group consisting of halogen, $NH_2$, $NH(C_{1-6}$-alkyl), $N(C_{1-6}$-alkyl)$_2$, OH, Ophenyl and $OC_{1-6}$-alkyl.

If the group $C_{1-6}$-alkyl occurs more than once, these alkyl groups can be identical or different.

For the purposes of the present invention, the hydroxy or keto group of alpha-pyridone and gamma-pyridone is not counted as a substituent since this group is necessarily present in the ring in order to obtain, at least for one limiting structure, a ring nitrogen bound to hydrogen.

Preference is given to the substituents bound to the ring system having no further substituents.

Preferred substituents bound to the ring system are $C_{1-6}$-alkyl, phenyl, $NH_2$ and OH. $C_{1-6}$-alkyl and $NH_2$ are more preferred. Particular preference is given to $C_{1-6}$-alkyl.

In a further preferred embodiment, the ring system is selected from the group consisting of

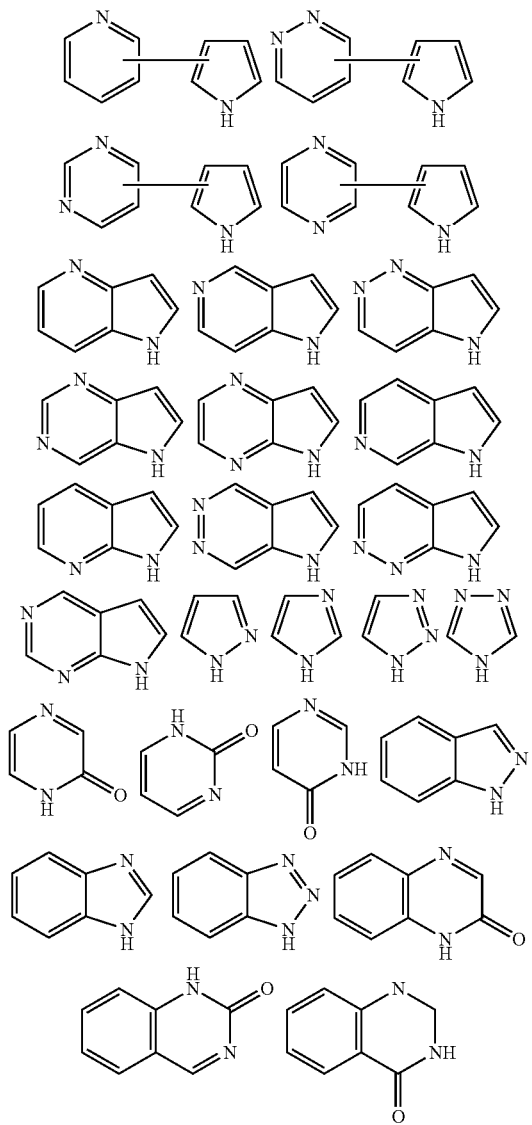

Further preferred ring systems are an imidazole, benzimidazole, triazole, 2-hydroxypyrimidine or 4-hydroxypyrimidine, very particularly preferably selected from the group consisting of 2-methylimidazole, 2-ethylimidazole, benzimidazole, 1,2,4-triazole, 3-amino-1,2,4-triazole, 3,5-diamino-1,2,4-triazole, 2-hydroxypyrimidine and 4-hydroxypyrimidine and their deprotonated forms.

In a preferred embodiment the at least one at least bidentate organic compound is derived from a di-, tri- or tetracarboxylic acid or a monocyclic, bicyclic or polycyclic ring system which is derived from at least one heterocycle selected from the group consisting of pyrrole, alpha-pyridone and gamma-pyridone.

In a particularly preferred embodiment the at least one at least bidentate organic compound is a di- or tricarboxylic acid or substituted or unsubstituted imidazole.

Particular preference is given to using imidazoles such as 2-methylimidazole, acetylenedicarboxylic acid (ADC), camphordicarboxylic acid, fumaric acid, succinic acid, benzenedicarboxylic acids such as phthalic acid, isophthalic acid, terephthalic acid (BDC), aminoterephthalic acid, triethylenediamine (TEDA), naphthalenedicarboxylic acids (NDC), biphenyldicarboxylic acids such as 4,4'-biphenyldicarboxylic acid (BPDC), pyrazinedicarboxylic acids such as 2,5-pyrazinedicarboxylic acid, bipyridinedicarboxylic acids such as 2,2'-bipyridinedicarboxylic acids such as 2,2'-bipyridine-5,5'-dicarboxylic acid, benzenetricarboxylic acids such as 1,2,3-, 1,2,4-benzenetricarboxylic acid or 1,3,5-benzenetricarboxylic acid (BTC), benzenetetracarboxylic acid, adamantanetetracarboxylic acid (ATC), adamantanedibenzoate (ADB), benzenetribenzoate (BTB), methanetetrabenzoate (MTB), adamantanetetrabenzoate or dihydroxyterephthalic acids such as 2,5-dihydroxyterephthalic acid (DHBDC) as at least bidentate organic compounds.

Very particular preference is given to, inter alia, 2-methylimidazole, 2-ethylimidazole, phthalic acid, isophthalic acid, terephthalic acid, 2,6-naphthalenedicarboxylic acid, 1,4-naphthalenedicarboxylic acid, 1,5-naphthalenedicarboxylic acid, 1,2,3-benzenetricarboxylic acid, 1,2,4-benzenetricarboxylic acid, 1,3,5-benzenetricarboxylic acid, 1,2,4,5-benzenetetracarboxylic acid, aminoBDC, TEDA, fumaric acid, biphenyldicarboxylate, 1,5- and 2,6-naphthalenedicarboxylic acid, tert-butylisophthalic acid, dihydroxybenzoic acid.

In particular, preference is given to 2-methylimidazole, terephthalic acid, 2,6- and 1,5-naphthalenedicarboxylic acid, isophthalic acid, fumaric acid, 1,3,5-benzenetricarboxylic acid, trimellitic acid, glutaric acid, 2,5-dihydroxyterephthalic acid and 4,5-imidazoledicarboxylic acid and also acids derived therefrom. Also preferred is formate as at least bidentate organic compound.

Very particular preference is given to fumaric acid, terephthalic acid, 1,3,5-benzenetricarboxylic acid and 2-methylimidazole.

In addition to these at least bidentate organic compounds, the metal organic framework can further comprise one or more monodentate ligands and/or one or more at least bidentate ligands which are not derived from a dicarboxylic, tricarboxylic or tetracarboxylic acid or from a monocyclic, bicyclic or polycyclic ring system which is derived from at least one heterocycle selected from the group consisting of pyrrole, alpha-pyridone and gamma-pyridone.

The pore size of the metal organic framework can be controlled by selection of the appropriate optional monodentate ligand and/or the at least bidentate organic compound. It is frequently the case that the larger the organic compound, the larger the pore size. The pore size is preferably from 0.2 nm to 30 nm, particularly preferably in the range from 0.3 nm to 3 nm, based on the crystalline material.

Examples of metal organic frameworks can be found in WO 2009/09277 in the Table (page 11 to 23), wherein—in addition to the designation of the MOF—the metal and the at least bidentate ligand, the solvent and the cell parameters (angles alpha, beta, and gamma and the dimensions A, B and C in Å) are indicated. The latter were determined by X-ray diffraction.

Further metal organic frameworks are MOF-2 to 4, MOF-9, MOF-31 to 36, MOF-39, MOF-69 to 80, MOF103 to 106, MOF-122, MOF-125, MOF-150, MOF-177, MOF-178, MOF-235, MOF-236, MOF500, MOF-501, MOF-502, MOF-505, IRMOF-1, IRMOF-61, IRMOP-13, IRMOP-51, MIL-17, MIL45, MIL-47, MIL-53, MIL-59, MIL-60, MIL-61, MIL-63, MIL-68, MIL-79, MIL-80, MIL-83, MIL-85, CPL-1 to 2, SZL-1 which are described in the literature.

Preferred metal organic frameworks are MIL-53, Zn-tBu-isophthalic acid, Al-terephthalate, MOF-5, IRMOF-8, Cu-1, 3,5-benzenentricarboxylate, Al-2,6-naphthalenedicarboxylate, Al-aminoterephthalate, Al-1,3,5-benzenentricarboxylate, Al-2,6-naphthalenedicarboxylate, Mg-2,6-naphthalenedicarboxylate, Al-fumarate, Zn-2-methylimidazolate, Zn-2-aminoimidazolate, MOF177, MOF-74, MOF-205, UiO66, MOF801, MOF808, Zn-dihydroxyterephthalate, Mn-terephthalate, Mg-formate, Fe-1,3,5-benzenetricarboxylate More preferred metal organic frameworks are Al-terephthalate, Al-fumarate, Al-1,3,5-benzenetricarboxylate, Mg-NDC, Mg-formate, MOF-74, MOF-5, MOF-177, MOF-205, IRMOF-8, Cu-1,3,5-benzenetricarboxylate and Zn-2-methylimidazolate, More preferred are Al-terephthalate, MOF-177, MOF-205, IRMOF-8, Cu-1,3,5-benzenetricarboxylate, Al-fumarate and Zn-2-methylimidazolate.

More preferred are Cu-1,3,5-benzenetricarboxylate, also referred to as Basolite™ C300 or HKUST1, Zn-2-methylimidazolate, also referred to as ZIF-8 or Basolite™ Z1200, Al-fumarate, also referred to as Basolite™ A520 and Al-terephthalate, also referred to as MIL-53 or Basolite™ A100, more preferred are Cu-1,3,5-benzenetricarboxylate, Al-fumarate and Zn-2-methylimidazolate; and particularly preferred are Cu-1,3,5-benzenetricarboxylate and Zn-2-methylimidazolate. Also preferred is Mg-formate (M050).

Process for the Preparation of the Metal-Organic Framework

In a first step of the inventive process a dry composition is prepared by mixing the at least one metal salt, corresponding to the metal ion in the metal-organic framework, and the at least one at least bidentate organic compound or a salt thereof.

The preparation of the metal-organic framework may require one or more further components other than the at least one metal salt and the at least one at least bidentate organic compound, for example a base or an acid.

If the synthesis of the metal-organic framework requires the use of at least one further component other than the at least one metal salt and the at least one at least bidentate organic compound, said further component is preferably added in step a) of the process according to the invention.

In embodiments, wherein such further components are required the dry composition of step a) is prepared by mixing the at least one metal salt, corresponding to the metal ion in the metal-organic framework, the at least one at least bidentate organic compound and at least one further component other than the at least one metal salt and the at least one at least bidentate organic compound.

For the purpose of the invention the term "dry" means that the starting materials are brought into contact with each other without adding any liquid respectively any solvent. In a preferred embodiment the term "dry" moreover means that the at least one metal salt, the at least one at least bidentate organic compound and any optional further components, for example bases or acids, are solid at ambient temperature.

The term "mixing" according to the present invention relates to the preparation of a largely uniform mixture of the at least one metal salt, the at least one at least bidentate organic compound and optionally at least one further component other than the at least one metal salt and the at least one at least bidentate organic compound.

The optional further component is preferably at least one base or at least one acid, particularly preferably at least one base.

Alternatively, the optional further component, preferably the at least one base or the at least one acid can be added in step b) of the process of the invention. This is preferred in the case that the reaction requires the addition of such a component, wherein the component is not solid in ambient temperature or not available in unsolved form.

Preferably the at least one base or the at least one acid is used in the form of a solid.

Suitable bases are hydroxides, for example alkali metal hydroxides or alkaline earth metal hydroxides, particularly sodium hydroxide or potassium hydroxide; alkanolates, for example KOMe (potassium methylate) or NaOMe (sodium methylate); and ammonia or amine-group containing compounds. A particularly preferred base is sodium hydroxide.

Suitable acids are inorganic acids such as HCl, $HNO_3$, $H_2SO_4$, $H_3PO_4$ or $HClO_4$; or mono-protic organic acids such as formic acid, acetic acid or propionic acid; preferably formic acid, acetic acid or HCl.

In the case that the at least one metal salt and/or the at least one at least bidentate organic compound and/or at least one optional further component are present in the form of agglutinated or agglomerated particles the single compounds may be comminuted, pulverized or finely ground before step a) of the process is conducted. It is also possible to combine the step of mixing the at least one metal salt, the at least one at least bidentate organic compound and optional further components (i.e. step a)) with the step of comminuting, pulverizing or grounding at least one of those starting materials, optionally comprising agglutinated or agglomerated particles.

Usually, mixing of the at least one metal salt and the at least one at least bidentate organic compound is carried out for at least 5 minutes. In general, it is—of course—possible, to perform the mixing in step a) arbitrarily long. However, in view of the procedural economy step a) is preferably not carried out for more than 10 to 30 min.

Step a) of the present process may be carried out in all known reaction vessels suitable for mixing, respectively stirring or kneading, of dry mixtures and the skilled person is able to make a suitable selection. A suitable reaction vessel is for example a mix muller, a kneader, a Sela-kneader, a Listkneader (for example a discotherm kneader), Buss-kneader-reactors, a Krauss-Maffei-kneader, mixers, a discothermic mixer, planetary mixers, ploughshare mixers, coaxiale mixers, a Lödige mixer, a Eirich mixer, a Kitchen Aid, or a Thermomix. However, in a preferred embodiment step a) of the process for the preparation of the MOF is carried out in a kitchen aid, a discothermic mixer, a planetary mixer, a List kneader, a Lödiger mixer or a Sela-kneader, particularly preferred in a discothermic mixer.

The molar ratio of the at least one metal ion and the at least one at least bidentate organic compound is preferably in the range from 10:1 to 1:10, preferably 5:1 to 1:5, more preferably 4:1 to 1:4.

In a particularly preferred embodiment the at least one metal ion and the at least one at least bidentate organic compound, and optionally the at least one base or the at least one acid, are used in stoichiometric amounts in step a), i.e. no excess of the at least one metal ion, the at least one at least bidentate organic compound or the optionally added further component, for example at least one base or at least one acid, is used. The actual molar ratio of metal ion, organic compound and the optionally added further component, i.e. the at least one base or acid in this case depends on the nature of the starting materials, particularly the charge of the metal ion and the number of coordination sites of the organic compound.

By way of examples said matter should be clarified: For example, when the MOF to be prepared in the inventive process is Cu-1,3,5-benzenetricarboxylate the preferred molar ratio of the at least one metal ion—$Cu^{2+}$—and the at least one organic compound—benzene-1,3,5-tricarboxylic acid—is 3:2. When the MOF prepared in the inventive process is Zn-2-methyimidazolate the preferred molar ratio of $Zn^{2+}$ and 2-methylimidazole is 1:2. When the MOF prepared in the inventive process is an aluminum-based MOF the preferred molar ratio of $Al^{3+}$, dicarboxylic acid, preferably terephthalic or fumaric acid, and a base, preferably NaOH, is 1:1:3.

In step b) of the process according to the invention a solvent is added to the dry composition obtained in step a), wherein the solvent comprises 25 to 75% by volume of at least one alcohol and 25 to 75% by volume of water, wherein the given amounts are based on the total volume of the solvent.

In a preferred embodiment the solvent comprises 45 to 55% by volume of at least one alcohol and 45 to 55% by volume of water, particularly preferably the at least one solvent comprises 50% by volume of at least one alcohol and 50% by volume of water, wherein the given amounts are based on the total volume of the solvent.

In a preferred embodiment the solvent consists of 25 to 75% volume of at least one alcohol and 25 to 75% by volume of water, preferably of 45 to 55% by volume of at least one alcohol and 45 to 55% by volume of water, particularly preferably the at least one solvent consists of 50% by volume of at least one alcohol and 50% by volume of water.

The term "volume" for the purpose of the invention refers to the volume at room temperature, preferably at 20° C. to 25° C., preferably 23° C.

In a preferred embodiment the at least one alcohol is an alkanol selected from methanol, ethanol, n-propanol, iso-propanol, 1-butanol, 2-methyl-1-propanol, 2-butanol, 2-methyl-2-propanol, or a mixture of two or more thereof. Particularly preferably the at least one alcohol is methanol, ethanol, isopropanol, n-propanol or a mixture of two or more thereof, especially preferably the at least one alcohol is ethanol or methanol or a mixture thereof and more preferably the at least one alcohol is ethanol. Thus, in a preferred embodiment the solvent comprises 18.7 to 70.3% by weight, preferably 38.2 to 49.1% by weight and particularly preferably 44% by weight of ethanol and 29.7 to 81.3% by weight, preferably 50.9 to 61.8% by weight, particularly preferably 56% by weight water, wherein the given amounts are based on the total weight of the solvent. The used alcohol may be used in the form of absolute alcohol as well as in the form of denaturated alcohol, for example denaturated with methyl ethyl ketone (butanone, MEK), Bitrex™ (denatonium benzoate) or toluene.

In a preferred embodiment of the inventive process the solvent-containing composition obtained in step b) comprises, preferably consists of, 30 to 80% by weight of the dry composition obtained in step a) and 20 to 70% by weight of the at least one solvent, wherein the given amounts are based on the total weight of the solvent-containing composition. That is the solid content of the solvent-containing composition is preferably in the range from 30 to 80%.

The solid content is calculated according to the following formula:

$$\text{Solid content [\%]} = [\text{mass solids}/(\text{sum mass of solids} + \text{mass solvents})] \times 100$$

The solid content is preferably 30 to 70%, preferably 40 to 60%, more preferably 45 to 55% and very particularly preferably 50% to 55%. Said ranges apply preferably in the case, that the preparation of the MOF does not require the addition of further components, for example a base or an acid.

In another embodiment the solid content is preferably 50 to 80%, preferably 60 to 80% and particularly preferably 70 to 78%. Said ranges apply preferably in the case, that the preparation of the MOF requires the addition of further components, for example at least one base or at least one acid, wherein said additional component is solid at ambient temperature.

In this case, the "mass solids" in the above-given formula is the mass of the at least one metal salt, the at least one at least bidentate organic compound and optional further components.

The water used in step b) of the present process is tap water, distilled water or demineralized water. In a typical and preferred embodiment demineralized water is used.

In step c) of the inventive process the solvent-containing composition obtained in step b) comprising the at least one metal salt, the at least one at least bidentate organic compound and the solvent, is mixed to obtain the MOF in form of a homogenous powder.

Step c) may be conducted in all reaction vessels suitable for the mixing of dry or wet compositions, however, in a preferred embodiment, the mixing steps in the present process step a) and step c) are conducted in the same reaction vessel, preferably in a kitchen aid, a sela-kneader, a discothermic mixer or planetary mixer, a List kneader, a Lödiger mixer or a Sela-kneader, preferably in in a kitchen aid, a sela-kneader, a discothermic mixer or planetary mixer, particularly preferred in a discothermic mixer.

Preference is given to a process wherein the mixing in step c) of the solvent-containing composition of step b) is carried out pressureless.

"Pressureless" in the sense of the invention means that no pressure is directly applied to the composition for the purpose or for the effect of compacting the solvent-containing composition, i.e. compressing it to form a compact or the like. Thus, the use of reaction vessels, wherein such a compression of the solvent-containing composition of step b) occurs, for example the use of an extruder, is not suitable.

However, "pressureless" does not mean that no physical forces affect the mixture at all. Physical forces, which may affect the composition while step c) are for example shear forces, or and/or normal forces.

In one preferred embodiment, the reaction vessel used for step c) is a mixing devise which has a high extent of self-cleaning. Self-cleaning refers to a forced cleaning of the walls and/or mixing internals by additional internals (for example rotor stator setups and rotor rotor setups).

In this context suitable reaction vessels are for example single shaft kneaders (for example type discotherm of List) whose kneading elements intermesh with counter-hooks attached to the outer casing of the processing chamber. The rotation speed and geometry of the self-cleaning shaft and kneading elements are custom designed to optimize the mixing, surface renewal rate, and residence time distribution. Further suitable reaction vessels are Twin Shaft Kneader Reactors (for example of List), wherein high-torque shafts are designed to rotate in either the same direction or in opposite directions. In both cases, the kneading elements on the shafts intermesh to generate intensive surface renewal and mixing. At the same time, shear rates remain low. The above-mentioned single shaft kneaders are—due to their geometry and construction—type highly self-cleaning (about 80%). Twin Shaft Kneader Reactors are nearly 100% self-cleaning. Comparable setups are available from for example BUSS or KRAUSS MAFFEI.

The mixing of step c) of the inventive process is carried out until the metal-organic framework material is obtained in the form of a homogenous powder. Typical reaction times are from 5 to 120 minutes, preferably the mixing of the solvent-containing composition of step b) is carried out for 10 to 90 minutes, more preferably for 20 to 60 minutes and particularly preferably for 25 to 35 minutes.

In step c), preferably performed pressureless, the produced MOF is obtained in the form of a homogenous powder.

For the purpose of the invention the term "homogenous powder" relates to a powder, which has a uniform appearance, i.e. the MOF is obtained in the form of one single phase, wherein the phase mainly consists of free-flowing powder which is free of agglomerates or the like.

"Powder" in the sense of the invention relates to a powder or pulverulent material, which has a fine powdery grain size and may contain or consist of crystallites (small crystals), wherein however, the above-explained requirement of homogeneity has to be fulfilled. The maximum grain size of the powder is preferably less than 0.2 mm for each direction.

This effect can probably be explained as follows: Step c) comprises the mixing step per se, which furthermore is conducted in the presence of relatively low solvent amounts. After the conversion of the at least one metal salt and the at least one at least bidentate organic compound to the metal-organic framework, the at least one solvent is largely, respectively completely, located in the pores of the metal-organic framework.

Since the MOF is obtained in step c) in form of a homogenous powder no further steps, such as sieving, washing, drying or milling are mandatory to obtain the metal-organic framework in a form which allows the immediate use and/or the further processing of the metal-organic framework, for example into shaped bodies.

The obtained MOF in form of a homogenous powder preferably has a LOD ("Loss on drying") of less than 50% by weight and is free of agglomerates.

To determine the LOD a sample of the prepared material is weighed, than dried and then re-weighed. The drying step advantageously is carried out at a temperature of 80 to 250° C. (depending on the solvent used in step b) of the inventive process) and optionally in vacuo (for example 20 mbar). However, irrespective of the selected temperature or the applied vacuum the step of drying is carried out under suitable conditions until constant weight of the sample.

The LOD can be determined for example in a moisture analyser, for example of Mettler Toledo (for example Moisture Analyser HB 43 S) or Satorius (for example Infrared Moisture Analyser MA150C-000230V1)

In a preferred embodiment of the inventive process steps a) to c) are carried out at a temperature in the range from 15 to 100° C., preferably from 20 to 50° C., preferably steps a), b) and c) are carried out without heating. Particularly preferably, steps a) and b) take place at ambient temperature.

However, in the case that the formation of the MOF by the reaction of the at least one metal salt and the at least one at least bidentate organic compound is an exothermic reaction (i.e. energy is released from the system while the reaction), an increased temperature may prevail up to 100° C. in the reaction vessel, especially after the addition of the at least one solvent to the dry mixture and subsequent mixing of the resulting solvent-containing mixture. Cooling of the reaction vessel is—in general—possible, however, not necessary.

As explained above, the obtained powder thus has good processing properties directly after step c). Usually necessary steps such as washing, filtration and/or sieving of the metal organic framework are not mandatory.

A further advantageous effect of the process according to the invention can be found in high yields of the product, especially high space-time-yields. The space time yields achieved with the present process is preferably at least 10 000 kg/m$^3$/d, preferably at least 20 000 kg/m$^3$/d, preferably at least 25 000 kg/m$^3$/d and particularly preferably at least 35 000 kg/m$^3$/d. The given space-time-yield is a result of the amount of the product (in kg) per volume (in m$^3$) per time (in days), wherein the time preferably is the reaction time.

Optional Process Steps

As explained before one essential advantage achieved by the present process for the preparation of the MOF is that the product is obtained in the form of a homogenous powder which allows immediate further processing, for example into shaped bodies.

However, further steps, especially washing or drying of the obtained MOF can be carried out if this is desired, for example in view of a specific subsequent use of the metal-organic framework or a specific subsequent processing step.

Thus, in an alternative preferred embodiment the metal-organic framework in the form of a homogenous powder obtained in step c) of the process is washed and/or dried.

The steps of washing and/or drying may also be carried out in the case that the preparation of the MOF is accompanied by the formation of byproducts, which may be undesirable and/or disturbing in the further use of the powder or the use of the shaped bodies produced thereof. In the preferred embodiment however, the starting materials, i.e. at least one metal salt, at least one at least bidentate organic compound and optionally added further components are selected such that no undesirable and/or disturbing byproducts are formed.

Optional washing and/or drying steps can be carried out according to all conventional methods known to the person skilled in the art.

The metal organic frameworks are typically dried by heating them to from about 80° C. to 250° C. To avoid a reaction—especially an oxidation reaction—of the metal organic frameworks with atmospheric oxygen, this is preferably accompanied by application of reduced pressure or use of protective gas such as nitrogen or argon.

The drying step can be conducted to remove the at least one solvent and optional present small amounts of the at least one at least bidentate organic compound.

In addition or as an alternative thereto, the removal of optional present small amounts of the at least one at least bidentate organic compound or the solvent, the at least one metal salt or byproducts comprising the counter ions of the at least one metal salt can be effected by washing the framework with an aqueous or non-aqueous solvent. The washing step preferably takes place before a drying step, if the latter is provided.

A washing step may be preferably carried out when the counter ion of the at least one metal salt in step a) is an ion which may have an unfavorable effect on the metal-organic framework, for example a nitrate anion. However, preferably no metal salt comprising such disadvantageous counter ions is used in the present process.

A washing step may also be preferably carried out to remove optionally high boiling solvents from the pores of the MOF, especially in the case that the alcohol used in the process is a relatively high-boiling alcohol for example 1-butanol.

Suitable non-aqueous solvents are—in general—for example $C_1$-$C_6$-alkanol, i.e. an alcohol having from 1 to 6 carbon atoms, for example methanol, ethanol, n-propanol, isopropanol, n-butanol, ispbutanol, t-butanol, pentanol, hexanol and mixtures thereof; dimethyl sulfoxide (DMSO), N,N-dimethylformamide (DMF), N,N-diethylformamide (DEF), acetonitrile, toluene, dioxane, benzene, chlorobenzene, pyridine, tetrahydrofuran (THF), ethyl acetate, dichloromethane, chloroform, acetone, hexane, optionally halogenated $C_1$-$C_{200}$-alkane, sulfolene, glycol, N-methylpyrrolidone or mixtures thereof.

An optionally halogenated $C_{1-200}$-alkane is an alkane which has from 1 to 200 carbon atoms and in which one or more up to all hydrogen atoms can be replaced by halogen, preferably chlorine or fluorine, in particular chlorine. Examples are chloroform, dichloromethane, tetrachloromethane, dichloroethane, hexane, heptane, octane and mixtures thereof.

However, particularly when a washing step is carried out to remove high-boiling solvent from the pores the preferred solvents used for the washing step are solvents having a relatively low boiling point.

Therefore, a preferred solvent is water, methanol, ethanol, acetone, chloroform or a mixture thereof. Particular preference is given to water, ethanol or methanol. In this context a suitable solvent is absolute ethanol as well as denaturated ethanol, for example ethanol which is denaturated with methyl ethyl ketone (butanone, MEK), Bitrex™ (denatonium benzoate) or toluene.

In addition to or as an alternative to the above-mentioned drying and/or washing steps, the removal of the at least one organic compound (ligand) from the pores of the porous metal organic framework can be effected by treatment of the framework formed with a further solvent. Here, the ligand is removed in a type of "extraction process" and may, if appropriate, be replaced by a solvent molecule in the framework. This mild method is particularly useful when the ligand is a high-boiling compound.

The treatment preferably takes at least 30 minutes and can typically be carried out for up to 2 days. This can occur at room temperature or elevated temperature. It is preferably carried out at elevated temperature, for example at least 40° C., preferably 60° C. The extraction is more preferably carried out at the boiling point of the solvent used (i.e. under reflux).

The treatment can be carried out in a simple vessel by slurrying and stirring of the framework. It is also possible to use extraction apparatuses such as Soxhlet apparatuses, in particular industrial extraction apparatuses.

Solvents which can be used are, for example, $C_{1-6}$-alkanol, i.e. an alcohol having from 1 to 6 carbon atoms, for example methanol, ethanol, n-propanol, i-propanol, n-butanol, i-butanol, t-butanol, pentanol, hexanol and mixtures thereof; dimethyl sulfoxide (DMSO), N,N-dimethylformamide (DMF), N,N-diethylformamide (DEF), acetonitrile, toluene, dioxane, benzene, chlorobenzene, methyl ethyl ketone (MEK), pyridine, tetrahydrofuran (THF), ethyl acetate, optionally halogenated $C_{1-200}$-alkane, sulfolane, glycol, N-methylpyrrolidone (NMP), gamma-butyrolactone, alicyclic alcohols such as cyclohexanol, ketones, such as acetone or acetylacetone, cyclic ketones, such as cyclohexanone or mixtures thereof.

Preference is given to methanol, ethanol, propanol, acetone, MEK and mixtures thereof.

A very particularly preferred extractant is methanol.

Shaped Bodies

In a preferred embodiment the metal organic framework in form of a homogenous powder is molded into shaped bodies.

Thus, a further aspect of the present invention is a process for the preparation of shaped bodies comprising the steps
d) preparation of a metal-organic framework according to the process of the invention; and
e) molding the metal-organic framework into shaped bodies.

As described before the metal-organic framework according to the invention can be used after step c) without any further processing or purification steps and therefore can be directly molded into shaped bodies. Thus, the additional time and energy input, which is necessary to remove the relatively large amounts of solvent after conventional batch syntheses is rendered unnecessary. A further advantage accompanied with the present invention is that the solvent of the synthesis remains in the pores, which can stabilize the framework of the metal-organic material while the molding step.

In a preferred embodiment of the process for the preparation of shaped bodies, no further steps a carried out between step d) and step e).

To form shaped bodies according to the invention, several routes exist, among them molding the MOF in powder form alone or in combination with at least one binder and/or other components into a shaped body. In this context, the term "molding" refers to any process known to the expert in the field by which a porous material can be converted to a shaped body that is stable under the conditions of its intended use.

While the step of molding into the shaped bodies is mandatory, the following steps are optional: The molding may be preceded by a step of mixing, or by a step of preparing a paste-like mass or a fluid containing the porous material, for example by adding at least one binder and/or other components. That is, the step of shaping is carried out after mixing or kneading of the MOF either alone or together with at least one binder and/or other components to give a mixture.

The mixing of the MOF either alone or together with at least one further component can be carried out in a mixer, such as intensive mixers, rotary plates, marumerizers, and any other equipment known by a person skilled in the art. Preferred mixers are selected from the group consisting of intensive mixers, rotary plates, ball formers and marumerizers.

The molding step can—in general—be carried out at elevated temperatures, for example in the range from room temperature to 300° C. and/or at superatmospheric pressure, for example in the range from atmospheric pressure to a few hundred bar, and/or in a protective gas atmosphere, for example in the presence of at least one noble gas or nitrogen, dry air with a relative humidity of preferably less than 45% or a mixture of two or more thereof.

As described above, the step of molding can be performed in the presence of binders, and/or other additional substances that stabilize the materials to be agglomerated. As to at least one optional binder, any material known to an expert to promote adhesion between the particles to be molded together can be employed. A binder, an organic viscosity-enhancing compound and/or a liquid for converting the material into a paste can be added to the MOF in powder form, with the mixture being subsequently compacted.

Preferred binders are, for example, aluminum oxide or binders comprising aluminum oxide, as are described, for example, in WO 94/29408, silicon dioxide as described, for example, in EP 0 592 050 A1, mixtures of silicon dioxide and aluminum oxide, as are described, for example, in WO 94/13584, clay minerals as described, for example, in JP 03-037156 A, for example montmorillonite, kaolin, bentonite, hallosite, dickite, nacrite and anauxite, alkoxysilanes as described, for example, in EP 0 102 544 B1, for example tetraalkoxysilanes such as tetramethoxysilane, tetraethoxysilane, tetrapropoxysilane, tetrabutoxysilane, or, for example, trialkoxysilanes such as trimethoxysilane, triethoxysilane, tripropoxysilane, tributoxysilane, alkoxytitanates, for example tetraalkoxytitanates such as tetramethoxytitanate, tetraethoxytitanate, tetrapropoxytitanate, tetrabutoxytitanate, or, for example, trialkoxytitanates such as trimethoxytitanate, triethoxytitanate, tripropoxytitanate, tributoxytitanate, alkoxyzirconates, for example tetraalkoxyzirconates such as tetramethoxyzirconate, tetraethoxyzirconate, tetrapropoxyzirconate, tetrabutoxyzirconate, or, for example, trialkoxyzirconates such as trimethoxyzirconate, triethoxyzirconate, tripropoxyzirconate, tributoxyzirconate, silica sols and/or amphiphilic substances and/or graphites, copper, graphite, ascorbyl palmitate, expanded natural graphite (ENG), silicon carbide, polysaccharides, fatty acids, alkyl silicon resins, metal-organic framework materials, where the metal-organic framework has a layer composition, or mixtures thereof.

Suitable binders are for example commercially available under trade names like Pural® SB (aluminum oxide), Ludox® AS 40 (colloidal silica), or Silres® MSE100 (methyl and methoxy groups containing polysiloxane).

Preferred binders are graphite, stearic acid, magnesium stearate, copper platelets, silicon carbide, expanded natural graphite (ENG), ascorbyl palmitate, polysaccharides, for example commercially available as Zusoplast PS1, aluminum oxide, for example commercially available as Pural SB or mixtures thereof. Some of those binders, for example polysaccharides, can further act as pore-forming agents.

Preference is given to graphite and polysaccharides, particularly preferred is graphite.

As viscosity-increasing compound, it is, for example, also possible to use, if appropriate in addition to the abovementioned compounds, an organic compound and/or a hydrophilic polymer such as cellulose or a cellulose derivative such as methylcellulose and/or a polyacrylate and/or a polymethacrylate and/or a polyvinyl alcohol and/or a polyvinylpyrrolidone and/or a polyisobutene and/or a polytetrahydrofuran.

As pasting agent, it is possible to use, inter alia, preferably water or at least one alcohol such as a monoalcohol having from 1 to 4 carbon atoms, for example methanol, ethanol, n-propanol, isopropanol, 1-butanol, 2-butanol, 2-methyl-1-propanol or 2-methyl-2-propanol or a mixture of water and at least one of the alcohols mentioned or a polyhydric alcohol such as a glycol, preferably a water-miscible polyhydric alcohol, either alone or as a mixture with water and/or at least one of the monohydric alcohols mentioned.

In a preferred embodiment, the shaped body comprises at least 1% by weight of a binder. Preferably the shaped body comprises less than 10% by weight of a binder and most preferably, the shaped body comprises between 1.5% and 5% by weight of a binder and most preferably between 2.5% and 3.5% by weight, based on the total weight of the shaped bodies. Alternatively, no binder is used.

Further additives which can be used are, inter alia, amines or amine derivatives such as tetraalkylammonium compounds or amino alcohols and carbonate-comprising compounds, for example calcium carbonate. Such further additives are described, for instance, in EP 0 389 041 A1, EP 0 200 260 A1 or WO 95/19222. Further, pore-forming agents such as organic polymers, preferably polysaccharide, methylcellulose, polyethylene oxide or mixtures thereof can be added. As described above some of these pore forming agents can also act as a binder. Preferably, the shaped body comprises between 1% and 50% by weight of further additives and more preferably between 3% and 20% by weight, based on the total weight of the shaped bodies. In an alternative preferred embodiment, no further additives are used. In this context the given amounts refer to additives which do not fall under the above-given definition of binders.

The order of the additives such as template compound, binder, pasting agent, viscosity-increasing substance during shaping and kneading is in principle not critical.

Preferred processes to mold the MOF according to the invention into shaped bodies are extrusion or tableting/briquetting. For the purpose of the invention tableting and briquetting can be used synonymously.

The extrusion of the metal-organic framework according to the invention is effected in conventional extruders for example such that result in extrudates having a diameter of, usually, from about 1 to about 10 mm, in particular from about 1 to about 5 mm. Such extrusion apparatuses are described, for example, in Ullmann's Enzyklopädie der Technischen Chemie, 4th Edition, Vol. 2, p. 295 et seq., 1972. Alternatively to the use of an extruder, an extrusion press is preferably used for extrusion.

The extrusion can be performed at elevated pressure (ranging from atmospheric pressure to several 100 bar), at elevated temperatures (ranging from room temperature to 300° C.) or in a protective atmosphere (noble gases, nitrogen or mixtures thereof). Any combinations of these conditions are possible as well.

Typically, the pressure in the extruder or extrusion press is in a range from 50 bar to 250 bar, preferably from 50 bar to 150 bar.

Preferably, the molding composition is conveyed only once through the extruder or extrusion press.

Typically, the molding composition is converted into shaped bodies by being conveyed through the extruder or the extrusion press resulting in a string, which is cut or broken into individual shaped bodies.

When the molding step is performed by extrusion, the use of a pasting agent, for example water or at least one alcohol or a mixture of water and one or more alcohols, is preferred. In a preferred embodiment the MOF is mixed with at least one pasting agent and at least one binder before the molding step.

Typical amounts of at least one pasting agent are 1 to 15% by weight, preferably 3 to 8% by weight, based on the total weight of the shaped body.

Tableting/briquetting refers to the mechanical pressing of the MOF powder with or without binders and/or other components, preferably performed by using at least one method selected from the following group: briquetting by piston presses, briquetting by roller pressing, binderless briquetting and briquetting with binders.

The shaped bodies can be formed for example in an excenter press. A compacting force is preferably between 1 kN and 3000 kN, more preferably between 1 kN and 300 kN and most preferably between 10 kN and 150 kN. For higher forces the permeability of the shaped bodies is unnecessarily reduced and for smaller forces no stable shaped bodies are obtained. The smaller the shaped body, the higher the applied force can be chosen.

When the molding step is performed by tableting/briquetting, the use of a binder, preferably graphite, is preferred. It is also preferred, that no further additives, such as pasting agents or viscosity-increasing additives are added to the MOF before the molding step. It is also preferred that the step of molding is carried out at room temperature and under elevated pressure.

The shaped bodies obtained after molding can be subjected to a drying step and/or activation step, which is generally carried out at a temperature in the range from 80 to 250° C., preferably in the range from 80 to 150° C. at one or more temperature levels. Preferably, the shaped bodies are dried at a drying temperature in a range from 80° C. to 250° C. Preferably, the drying and/or activation are carried out under reduced pressure or under a protective gas atmosphere, comprising nitrogen or one or more noble gases or mixtures thereof.

Preferably, compounds added as additives while the molding step, i.e. at least one binder and/or other components, such as viscosity-increasing compounds, pasting agents, lubricants or other additives, and the solvent used in the process for the preparation of the metal-organic framework are at least partly removed from the shaped body during this drying process. Most, if not all, of the additive substances mentioned above may be removed from the shaped bodies by drying or heating, optionally in a protective atmosphere or under vacuum. In order to keep the MOF material intact, the shaped bodies are preferably not exposed to temperatures exceeding 300° C. However, studies show that heating and/or drying under the aforementioned mild conditions, in particular drying in vacuum, preferably at not more than 250° C., i.e. well below 300° C. is sufficient to at least remove organic compounds and water out of the pores of the MOF material. Generally, the conditions are adapted and chosen depending upon the additive substances used.

The possible geometries of the shaped bodies are in principle not subject to any restrictions. For example, possible shapes are, inter alia, rounded cubes, monoliths, pellets such as disk-shaped pellets, pills, spheres, granules, extrudates such as rods, honeycombs, grids, trilobes or hollow bodies.

Preferred forms are pellets, monoliths and rod-like extrudates. The shaped bodies preferably have an extension in at least one direction in space in the range from 0.2 mm to 30 mm, more preferably from 0.5 mm to 5 mm, in particular from 1 mm to 3 mm.

Depending on the reactants and the molding procedure, the shaped bodies preferably have a specific surface area of at least 300 $m^2/g$, preferably at least 500 $m^2/g$, more preferably at least 600 $m^2/g$, still more preferably at least 700 $m^2/g$, in particular preferably at least 800 $m^2/g$. In a particularly preferred embodiment, the shaped bodies have a specific surface area of at least 1000 $m^2/g$, particularly preferably at least 1200 $m^2/g$.

The specific surface area is determined according to BET (DIN ISO 9277:2003-05) by $N_2$ adsorption at 77 K.

In a preferred embodiment, the shaped bodies produced by extrusion have a resistance to pressure in the range from 2 N to 1000 N, preferably between 15 N and 100 N.

In a preferred embodiment, the shaped bodies produced by tableting/briquetting have a resistance to pressure in the range from 2 N to 1000 N, preferably between 20 N and 500 N, particularly preferred between 40 N and 250 N.

The resistance to pressure, also called cutting strength or side cutting strength, is defined within the meaning of the present invention as resistance to lateral pressure and can be measured with a hardness grading device by Zwick. The resistance to pressure can be measured on an apparatus from Zwick (model: BZ2.5/TS1S) according to DIN EN ISO 9001:2008.

Use of the Metal-Organic Framework Material

The metal-organic framework of the invention and also the shaped bodies of the invention are suitable for adsorbing, storing and releasing of at least one gas or of a mixture of two or more gases.

A preferred gas is a methane-containing mixture or methane. Another preferred gas is hydrogen. A further preferred gas is carbon dioxide ($CO_2$). A further preferred gas is water vapor, especially air humidity. Further preferred gases are shale gas, natural gas, exhaust gas, industrial fumes, ethane and propane or mixtures of two or more thereof.

Likewise, a further aspect of the present invention is accordingly a method of storing a gas, which comprises the step of bringing the gas into contact with a framework according to the invention or a shaped body according to the invention.

Methane or methane-containing gases are particularly suitable for this storage. Hydrogen is particularly suitable for this storage. Carbon dioxide is also particularly suitable for this storage. Water vapor is also particularly suitable for this storage.

If the MOF or the shaped bodies of the invention are used for storage, this is preferably carried out in a temperature range from −200° C. to 80° C. A temperature range from −80° C. to +80° C. is more preferred. A preferred pressure range is from 1 bar to 1000 bar (absolute), more preferably from 1 bar to 700 bar, particularly preferably from 1 bar to 300 bar and most preferably from 2 bar to 250 bar.

In a further preferred embodiment, wherein the MOF or the shaped bodies of the invention are used for the storage, the gas is stored in a storage vessel, comprising the MOF or the shaped bodies.

In a preferred embodiment, the storage vessel is mounted to a vehicle. The term "vehicle" includes but shall not be limited to cars, trucks, ships, airplanes, motorcycles, three-wheelers and the like.

In addition, the framework of the invention or the shaped body of the invention is suitable for separating a gas from a gas mixture.

A further aspect of the present invention is accordingly the use of a framework according to the invention or a shaped body according to the invention for separating a gas from a gas mixture.

Likewise, a further aspect of the present invention is accordingly a method of separating a gas from a gas mixture, which comprises the step: bringing a framework according to the invention or a shaped body according to the invention into contact with the gas mixture.

The gas mixture is, in particular, a gas mixture comprising methane and other gases. Here, methane is preferably removed from the gas mixture.

Likewise, the gas mixture can be a gas mixture comprising hydrogen.

Likewise, the gas mixture can be a gas mixture comprising carbon dioxide.

Processes for the separation by means of shaped bodies comprising a MOF can be used as known for shaped bodies and for example described in EP 1 674 555.

The present invention is illustrated by means of the examples and figures below.

EXAMPLES

Analytical Methods

The specific surface area was measured according to the BET-method (DIN ISO 9277:2003-05) and according to the Langmuir Method (DIN 66131:1993-07 and/or DIN 66134: 1998-2).

The obtained powders and shaped bodies were measured by x-ray diffractometry (XRD).

Tamped densities were determined using a jolting volumeter type STAV II from J. Engelsmann A G. The machine has been tested according to DIN ISO 787 (Part 11 of 1995) by the manufacturer. A weighed amount of the respective sample was put into a 1000 or 100 mL scaled cylinder. After tapping the cylinder 3000 times, the resulting volume of the packing was determined and the density calculated by dividing sample weight by sample volume.

The side cutting strength (SCS) was measured on an apparatus from Zwick (model BZ2.5/TS1S) according to DIN EN ISO 9001:2008.

The LOD was determined with a Moisture Analyser HB 43 S Halogen of Mettler Toledo.

Example 1

Starting Materials:

| | | |
|---|---|---|
| $Cu(OH)_2$ | 152 g | 1.56 mol |
| benzene-1,3,5-tricarboxylic acid | 208 g | 0.99 mol |
| EtOH | 180 ml | 142.2 g |
| water | 180 ml | 180 g |
| Solid content | 52.77% | mass solids/ (mass solids + mass solvents) |

Figure 1:
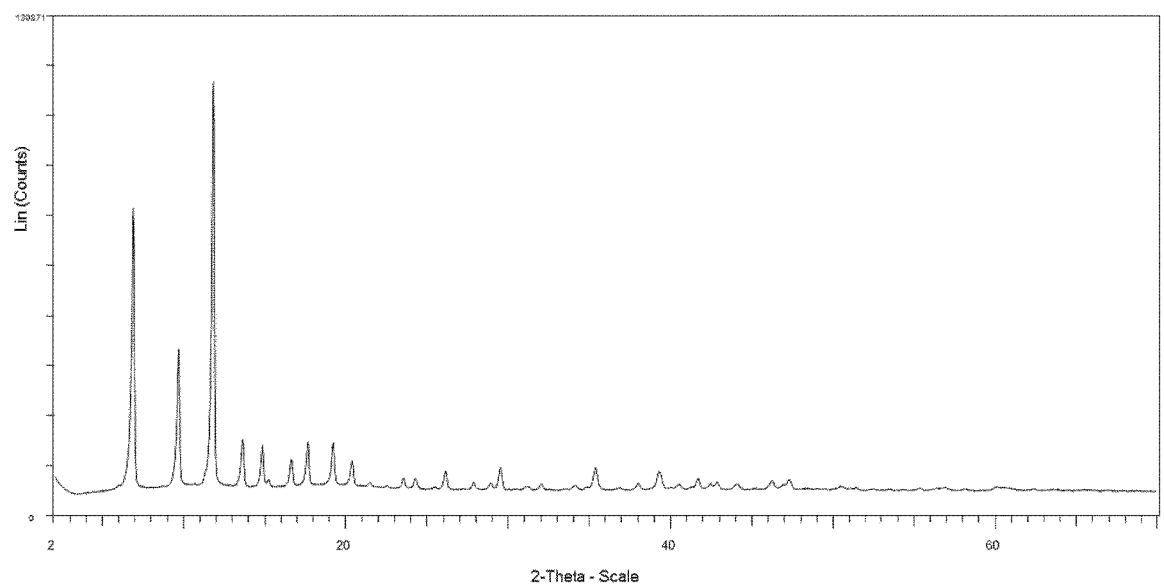
FIG. 1 shows the XRD diffractogram of Cu-1,3,5-benzenetricarboxylate obtained in example 1.

Copper hydroxide $Cu(OH)_2$ and benzene-1,3,5-tricarboxylic acid were placed in a kitchen machine BOSCH MUM6012 using a wire whisk as the stirrer. The solids were mixed for 10 minutes at 145 U/min (Level 1). Then the solvent was added and the mixture stirred for the reaction times defined in table 1. The products were obtained in the form of a homogenous powder. Afterwards the solids were dried in vacuum for 16 hours at 150° C. The drying step in all examples according to the invention was conducted to prepare the product for the analytical measurements. FIG. 1 shows the XRD diffractogram of the obtained Cu-1,3,5-benzenetricarboxylate.

TABLE 1

| Sample | Time (min) | Temperature (° C.) | BET-surface [m²/g] | Langmuir-surface [m²/g] | Space-time yield [kg/m³/d] |
|---|---|---|---|---|---|
| 1-1 | 10 | rt | 1226 | 1628 | 127600 |
| 1-2 | 20 | rt | 1214 | 1631 | 63800 |
| 1-3 | 30 | rt | 1213 | 1628 | 42533 |
| 1-4 | 40 | rt | 1244 | 1650 | 31900 |
| 1-5 | 50 | rt | 1250 | 1659 | 25520 |
| 1-6 | 60 | rt | 1239 | 1654 | 21267 |
| 1-7 | 70 | rt | 1263 | 1682 | 18229 |
| 1-8 | 80 | rt | 1261 | 1680 | 15950 |
| 1-9 | 90 | rt | 1203 | 1615 | 14178 |

Comparative Example 2

Starting Materials:

| | | |
|---|---|---|
| $Cu(OH)_2$ | 130 g | 1.33 mol |
| benzene-1,3,5-tricarboxylic acid | 178 g | 0.85 mol |
| EtOH | 3407 ml | 2691 g |
| water | 2000 ml | 2000 g |
| Solid content | 6.16% | mass solids/ (mass solids + mass solvents) |

The solvents were added to the reaction vessel. Afterwards $Cu(OH)_2$ and benzene-1,3,5-tricarboxylic acid were added while stirring. The obtained suspension was stirred for 15 minutes at room temperature and then heated to 50° C. and stirred at 150 U/min for the time defined in table 2. After the corresponding reaction time the suspension was filtered at 30° C. over a glas fritt (P4). No washing step was carried out. Afterwards the filtercake was dried in vacuum for 16 hours at 120° C.

Yield: 280 g dark blue powder (109% based on benzene-1,3,5-tricarboxylic acid, C2-18)

Analyses: Tamped density 310 g/l (C2-18)

TABLE 2

| Sample | Time (min) | Temperature (° C.) | BET-surface [m²/g] | Langmuir-surface [m²/g] | Space-time yield [kg/m³/d] |
|---|---|---|---|---|---|
| C2-1 | 1 | 46 | 721 | 960 | 1243 |
| C2-2 | 2 | 50 | 1046 | 1403 | 621 |
| C2-3 | 3 | 50.9 | 1128 | 1512 | 414 |
| C2-4 | 4 | 50.9 | 1261 | 1690 | 311 |
| C2-5 | 5 | 50.8 | 1268 | 1713 | 249 |
| C2-6 | 6 | 50.7 | 1299 | 1741 | 207 |
| C2-7 | 7 | 50.9 | 1329 | 1779 | 178 |
| C2-8 | 8 | 50.9 | 1302 | 1760 | 155 |
| C2-9 | 9 | 50.9 | 1356 | 1821 | 138 |
| C2-10 | 10 | 50.9 | 1361 | 1824 | 124 |
| C2-11 | 11 | 50.9 | 1367 | 1842 | 113 |
| C2-12 | 12 | 50.6 | 1363 | 1830 | 104 |
| C2-13 | 13 | 50.3 | 1366 | 1834 | 96 |
| C2-14 | 14 | 50.3 | 1294 | 1747 | 89 |
| C2-15 | 15 | 50.3 | 1302 | 1743 | 83 |
| C2-16 | 16 | 50.3 | 1337 | 1794 | 78 |
| C2-17 | 17 | 50.3 | 1326 | 1778 | 73 |
| C2-18 | 26 | 50.6 | 1317 | 1771 | 48 |

Example 3

Starting Materials:

| | | |
|---|---|---|
| $Cu(OH)_2$ | 176.8 g | 1.81 mol |
| benzene-1,3,5-tricarboxylic acid | 242.5 g | 1.15 mol |
| EtOH | 137 ml | 108 g |
| water | 206 ml | 206 g |
| Solid content | 57.16% | mass solids/ (mass solids + mass solvents) |

The solids were mixed in a kitchen aid (BOSCH, MUM6012 with whisk wire) for 10 minutes with 145 U/min (Level 1), then the solvents were added and the reaction was stirred for the time defined in table 3 at ambient temperature (slight temperature increase could be noticed). The product was obtained in the form of a homogenous powder. Afterwards the solid was dried in vacuum for 16 hours at 150° C.

Yield: 377 g light blue powder (110% based on based on benzene-1,3,5-tricarboxylic acid)

Analyses: Tamped density 613 g/l

TABLE 3

| Sample | Time (min) | Temperature (° C.) | BET-surface [m²/g] | Langmuir-surface [m²/g] | Space-time yield [kg/m³/d] |
|---|---|---|---|---|---|
| C3-1 | 10 | rt | 826 | 1093 | 158274 |
| C3-2 | 20 | rt | 880 | 1181 | 79137 |
| C3-3 | 30 | rt | 886 | 1175 | 52758 |

Example 4

Starting Materials:

| | | |
|---|---|---|
| $Cu(OH)_2$ | 152 g | 1.56 mol |
| benzene-1,3,5-tricarboxylic acid | 208 g | 0.99 mol |
| EtOH | 180 ml | 142.2 g |
| water | 180 ml | 180 g |
| Solid content | 52.77% | mass solids/ (mass solids + mass solvents) |

Solids were mixed in a kitchen aid (BOSCH, MUM6012 with whisk wire) for 10 minutes with 145 U/min (Level 1), then the solvents were added and the reaction was stirred for 30 minutes at ambient temperature (slight temperature increase could be noticed). The product was obtained in the form of a homogenous powder. Afterwards the solid was dried in vacuum for 16 hours at 150° C.

Yield: 319 g dark blue powder (108% based on based on benzene-1,3,5-tricarboxylic acid)

Space-time Yield: 42533 kg/m³/d
Analyses: Tamped density: 310 g/l
BET-surface: 1342 m²/g
Langmuir-surface: 1810 m²/g Example 5

Starting Materials:

| | | |
|---|---|---|
| $Cu(OH)_2$ | 160.74 g | 1.65 mol |
| benzene-1,3,5-tricarboxylic acid | 220.46 g | 1.05 mol |
| EtOH | 191 ml | 151 g |

-continued

| | | |
|---|---|---|
| water | 191 ml | 191 g |
| Solid content | 52.77% | mass solids/ (mass solids + mass solvents) |

The solids were mixed in a kitchen aid (BOSCH, MUM6012 with whisk wire) for 10 minutes with 145 U/min (Level 1), then the solvents were added and the reaction was stirred for the time defined in table 4 at ambient temperature (slight temperature increase could be noticed). The product was obtained in the form of a homogenous powder. Afterwards the solid was dried in vacuum for 16 hours at 150° C.

TABLE 4

| Sample | Time (min) | Temperature (° C.) | BET-surface [m$^2$/g] | Langmuir-surface [m$^2$/g] | Space-time yield [kg/m$^3$/d] |
|---|---|---|---|---|---|
| 5-1 | 10 | rt | 1229 | 1641 | 118502 |
| 5-2 | 20 | rt | 1226 | 1646 | 59251 |
| 5-3 | 30 | rt | 1204 | 1625 | 39501 |

Yield: 314 g dark blue powder (100% based on based on benzene-1,3,5-tricarboxylic acid)
Analyses: Tamped density: 501 g/l Example 6

Starting Materials:

| | | |
|---|---|---|
| Cu(OH)$_2$ | 124 g | 1.27 mol |
| benzene-1,3,5-tricarboxylic acid | 169 g | 0.80 mol |
| EtOH | 146.25 ml | 116 g |
| water | 146.25 ml | 146 g |
| Solid content | 52.79% | mass solids/ (mass solids + mass solvents) |

Figure 2:
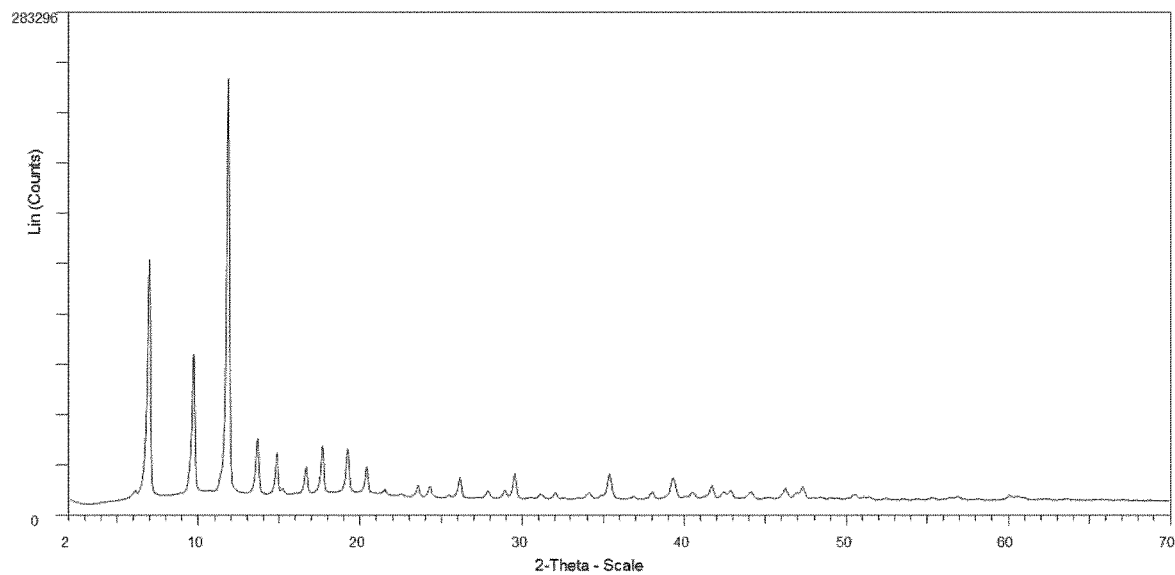
FIG. 2 shows the XRD diffractogram Cu-1,3,5-benzenetricarboxylate obtained in example 6.

The solids were mixed in a disothermic mixer (List) for 5 minutes with 30 U/min, then the solvents were added and the reaction was stirred for 30 minutes at ambient temperature (slight temperature increase could be noticed). The product was obtained in the form of a homogenous powder. Afterwards the solid was dried in vacuum for 16 hours at 150° C. FIG. 2 shows the XRD diffractogram of the obtained Cu-1,3,5-benzenetricarboxylate.

Yield: 227 g dark blue powder (95% based on based on benzene-1,3,5-tricarboxylic acid)
Space-time Yield: 37251 kg/m$^3$/d
Analyses: Tamped density: 457 g/l
BET-surface: 1164 m$^2$/g
Langmuir-surface: 1562 m$^2$/g Example 7

Starting Materials:

| | | |
|---|---|---|
| Cu(OH)$_2$ | 111.3 g | 1.14 mol |
| benzene-1,3,5-tricarboxylic acid | 152.1 g | 0.72 mol |
| EtOH | 132 ml | 104 g |
| water | 132 ml | 132 g |
| Solid content | 52.79% | mass solids/ (mass solids + mass solvents) |

The solids were mixed in a disothermic mixer (List) for 5 minutes with 30 U/min, then the solvents were added and the reaction was stirred for 30 minutes at ambient temperature (slight temperature increase could be noticed). The product was obtained in the form of a homogenous powder. Afterwards the solid was dried in vacuum for 16 hours at 150° C.

Yield: 200 g dark blue powder (93% based on based on benzene-1,3,5-tricarboxylic acid)
Space-time Yield: 36364 kg/m$^3$/d
Analyses: Tamped density: 425 g/l
BET-surface: 1416 m$^2$/g
Langmuir-surface: 1879 m$^2$/g Example 8

Starting Materials:

| | | | |
|---|---|---|---|
| [Zn(CO$_3$)]$_2$[Zn(OH)$_2$]$_3$ | 54.89 g | 0.1 mol | 0.5 mol Zn |
| 2-methylimidazole | 82.27 g | 1.0 mol | |
| MeOH | 43.44 ml | 34.32 g | |
| water | 43.44 ml | 43.44 g | |
| Solid content | 63.82% | mass solids/ (mass solids + mass solvents) | |

Figure 3:
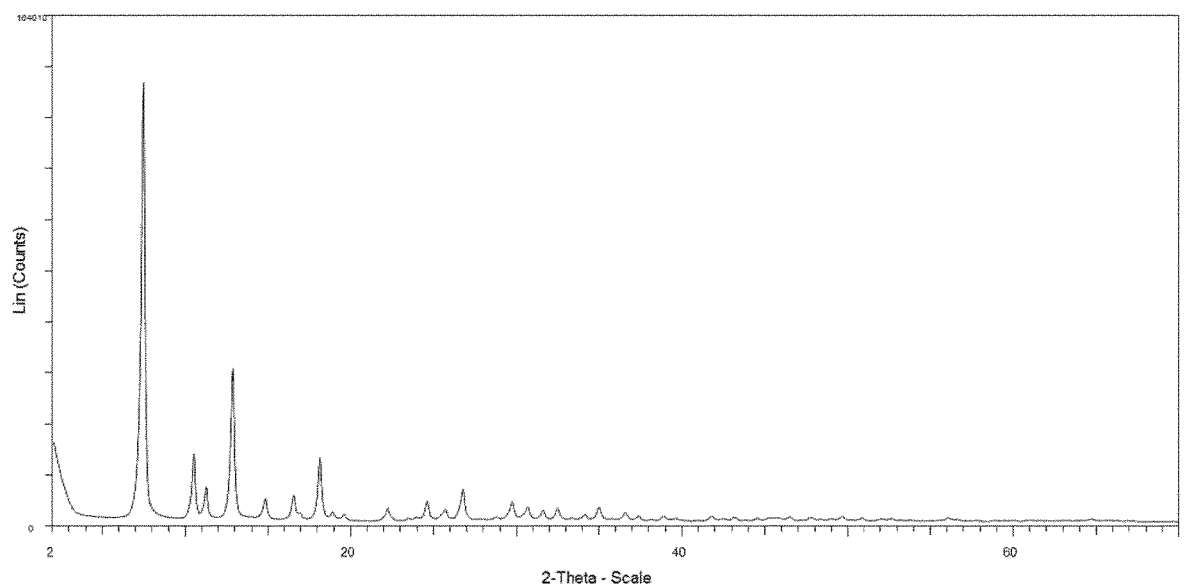
FIG. 3 refers to the XRD diffractogram of Zn-2-methylimidazolate obtained in example 8.

The solids were mixed in a kitchen aid (BOSCH, MUM6012 with whisk wire) for 10 minutes with 145 U/min (Level 1), then the solvents were added and the reaction was stirred for the time defined in table 5 at ambient temperature (slight temperature increase could be noticed). The product was obtained in the form of a homogenous powder. Afterwards the solid was dried in vacuum for 16 hours at 200° C. FIG. 3 shows the XRD diffractogram of the obtained Zn-2-methylimidazolate.

Yield: 99.8 g white (colorless) powder (88% based on 2-methylimidazole)
Analyses: Tamped density: 501 g/l

TABLE 5

| Sample | Time (min) | Temperature (° C.) | BET-surface [m$^2$/g] | Langmuir-surface [m$^2$/g] | Space-time yield [kg/m$^3$/d] |
|---|---|---|---|---|---|
| 8-1 | 20 | rt | 971 | 1303 | 82704 |
| 8-2 | 40 | rt | 1005 | 1343 | 41352 |
| 8-3 | 60 | rt | 1184 | 1557 | 27568 |

Example 9

Starting Materials:

| | | |
|---|---|---|
| Cu(OH)$_2$ | 109 g | 1.12 mol |
| benzene-1,3,5-tricarboxylic acid | 149 g | 0.71 mol |
| EtOH | 129 ml | 102 g |
| water | 129 ml | 129 g |
| Solid content | 52.76% | mass solids/ (mass solids + mass solvents) |

The solids were mixed in a planetary mixer (PC Labor-system GmbH) equipped with paddle mixers for 5 minutes with 50 U/min, then the solvents were added and the reaction was stirred for the time defined in table 6 at ambient temperature. The product was obtained in the form of a homogenous powder. Afterwards the solid was dried in vacuum for 16 hours at 150° C.

Yield: 167 g dark blue powder (80% based on benzene-1,3,5-tricarboxylic acid)

Analyses: Tamped density: 506 g/l

TABLE 6

| Sample | Time (min) | Temperature (° C.) | BET-surface [m²/g] | Langmuir-surface [m²/g] | Space-time yield [kg/m³/d] |
|---|---|---|---|---|---|
| 9-1 | 10 | rt | 1160 | 1546 | 93209 |
| 9-2 | 20 | rt | 1108 | 1478 | 46605 |
| 9-3 | 30 | rt | 1186 | 1582 | 31070 |

Example 10

Starting Materials:

| Cu(OH)$_2$ | 109 g | 1.12 mol |
|---|---|---|
| benzene-1,3,5-tricarboxylic acid | 149 g | 0.71 mol |
| EtOH | 129 ml | 102 g |
| water | 129 ml | 129 g |
| Solid content | 52.76% | mass solids/ (mass solids + mass solvents) |

The solids were mixed in a planetary mixer (PC Laborsystem GmbH) equipped with dough hook mixers for 5 minutes with 70 to 80 U/min, then the solvents were added and the reaction was stirred for the time defined in Table 7 at ambient temperature. The product was obtained in the form of a homogenous powder. Afterwards the solid was dried in vacuum for 16 hours at 150° C.

Yield: 210 g dark blue powder (100% based on benzene-1,3,5-tricarboxylic acid)

Analyses: Tamped density: 497 g/l

TABLE 7

| Sample | Time (min) | Temperature (° C.) | BET-surface [m²/g] | Langmuir-surface [m²/g] | Space-time yield [kg/m³/d] |
|---|---|---|---|---|---|
| 10-1 | 10 | rt | 1183 | 1574 | 117209 |
| 10-2 | 20 | rt | 1150 | 1531 | 58605 |
| 10-3 | 30 | rt | 1142 | 1520 | 39070 |

Example 11

Starting Materials:

| Cu(OH)$_2$ | 75.52 g | 0.77 mol |
|---|---|---|
| benzene-1,3,5-tricarboxylic acid | 104 g | 0.49 mol |
| EtOH | 90 ml | 71.1 g |
| water | 90 ml | 129 g |
| Solid content | 52.70% | mass solids/ (mass solids + mass solvents) |

The solids were mixed in a kneader (Firma Werner&Pfleiderer) for 10 minutes, then the solvents were added and the reaction was kneaded for 30 minutes at ambient temperature. The product was obtained in the form of a homogenous powder. Afterwards the solid was dried in vacuum for 16 hours at 150° C.

Yield: 306 g dark blue powder (78% based on benzene-1,3,5-tricarboxylic acid)

Space-time Yield: 81600 kg/m³/d

Analyses: Tamped density: 431 g/l

BET-surface: 1187 m²/g

Langmuir-surface: 1573 m²/g

Example 12

Starting Materials:

| Al$_2$(SO$_4$)$_3$ × 14 H$_2$O | 118 g | 0.198 mol |
|---|---|---|
| fumaric acid | 46 g | 0.40 mol |
| NaOH | 48 g | 1.20 mol |
| EtOH | 40 ml | 31.56 g |
| water | 40 ml | 40 g |
| Solid content | 74.76% | mass solids/ (mass solids + mass solvents) |

Figure 4:
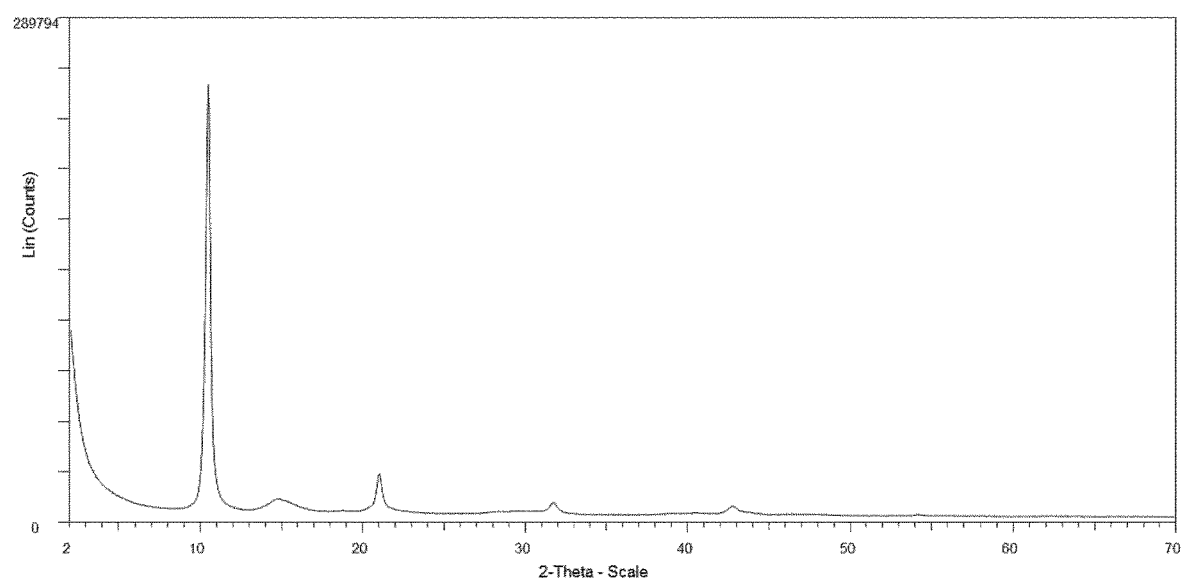
FIG. 4 refers to the XRD diffractogram of Al-fumarate obtained in example 12.

The solids were mixed in a kitchen aid (Bosch, MUM6012 with whisk wire) for 5 minutes with 145 U/min (Level 1), then the solvents were added and the reaction was stirred for 30 minutes at ambient temperature. The products were obtained in the form of a homogenous powder. Afterwards the mixture was transferred to a filter and washed with water until the filtrate showed a conductivity of <200 μS and then, the solid was dried in vacuum for 16 hours at 150° C. FIG. 4 shows the XRD diffractogram of the obtained Al-fumarate.

Yield: 45 g colorless (white) powder (72% based on fumaric acid)

Space-time Yield: 27 000 kg/m³/d

Analyses: Tamped density: 502 g/l

BET-surface: 886 m²/g

Langmuir-surface: 1180 m²/g

Example 13

Starting Materials:

| Al$_2$(SO$_4$)$_3$ × 14 H$_2$O | 237 g | 0.40 mol |
|---|---|---|
| fumaric acid | 93 g | 0.80 mol |
| NaOH | 96 g | 2.40 mol |
| EtOH | 80 ml | 63.12 g |
| water | 80 ml | 80 g |
| Solid content | 74.85% | mass solids/ (mass solids + mass solvents) |

The solids were mixed in a disothermic mixer (List) for 5 minutes with 20 U/min, then the solvents were added and the reaction was stirred for 30 minutes at ambient temperature (temperature increase could be noticed). The product was obtained in the form of a homogenous powder. Afterwards the mixture was transferred to a filter and washed with water until the filtrate showed a conductivity of <200 μS and then, the solid was dried in vacuum for 16 hours at 150° C.

Yield: 55 g colorless (white) powder (44% based on fumaric acid)

Space-time Yield: 16 500 kg/m³/d

Analyses: Tamped density: 416 g/l

BET-surface: 827 m²/g

Langmuir-surface: 1102 m²/g

Example 14

Starting Materials:

| | | |
|---|---|---|
| Cu-1,3,5-benzenetricarboxylate | 562 g | LOD 50% |
| Graphite | 8.8 g | |

Equipment:

Kilian SP300 No. 125 excentric press, 20 mm Stamp, filling level 9.7 mm immersion depth 5.7 mm, air humidity: <20%

Figure 5:
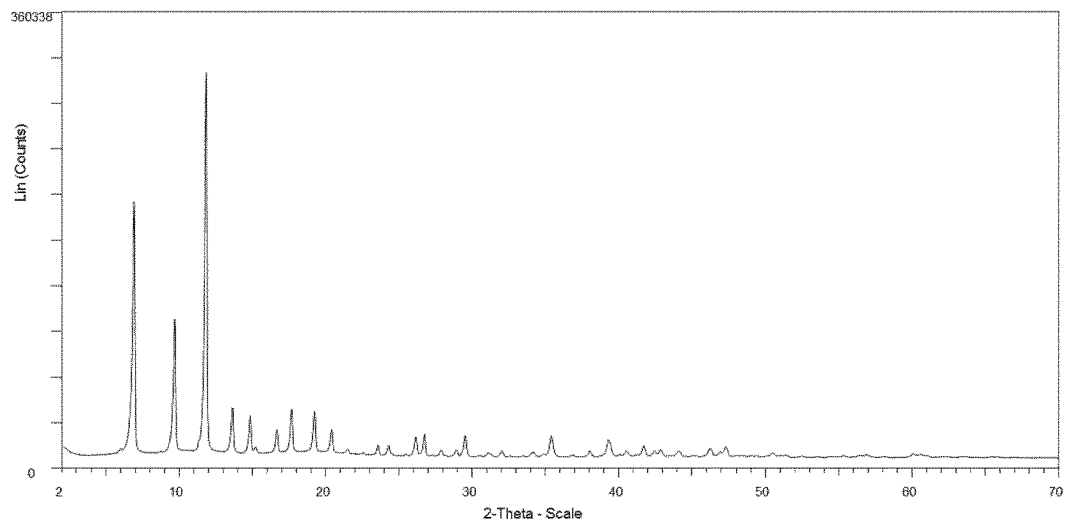
FIG. 5 shows the XRD diffractogram of shaped bodies according example 14 comprising Cu-1,3,5-benzenetricarboxylate.

The used Cu-1,3,5-benzenetricarboxylate acid was produced according to Example 5, wherein no drying step was carried out. The solids were mixed in a small container until a uniform mixture was obtained and afterwards compacted into pellets with a diameter of 10 mm and a height of 5 mm. The obtained pellets were then dried in vacuum at 150° C. for 16 h. FIG. 5 shows the XRD diffractogram of the obtained shaped bodies.

Analyses: SCS: 51±9 N
BET-surface: 1350 m$^2$/g
Langmuir-surface: 1788 m$^2$/g

Example 15

Starting Materials:

| | | |
|---|---|---|
| Cu-1,3,5-benzenetricarboxylate | 615 g | LOD 50% |
| polysaccharide (zusoplast PS1) | 6.41 g | |
| Poly(ethylene oxide) (PEO) | 6.41 g | |
| EtOH | 84 ml | 66.4 g |
| water | 84 ml | 84 g |

Equipment:

Mix muller, extrusion press Loomis

Figure 6:
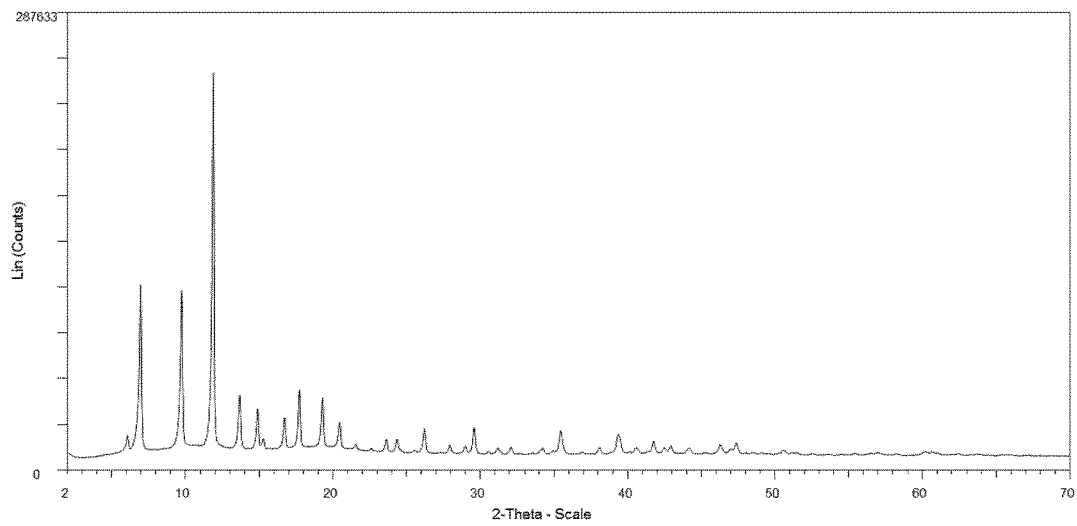
FIG. 6 refers to the XRD diffractogram of shaped bodies obtained in example 15 comprising Cu-1,3,5-benzenetricarboxylate.

The used Cu-1,3,5-benzenetricarboxylate acid was produced according to Example 1, wherein no drying step was carried out. The powder were mixed in a mix muller with polysaccharide and poly(ethylene oxide) for 5 minutes. Afterwards the additional solvent was added and the dough was mix mulled for 30 min. The dough was then transferred to an extrusion press (Fa. Loomis) and extruded (43 to 173 bar) into 3.5 mm extrudates. The obtained extrudates were then dried in vacuum at 150° C. for 16 h. FIG. 6 shows the XRD diffractogram of the obtained shaped bodies.

Analyses: SCS: 24±9 N
BET-surface: 908 m$^2$/g
Langmuir-surface: 1202 m$^2$/g

The invention claimed is:

1. A process for the preparation of a metal-organic framework, wherein the metal-organic framework comprises at least one at least bidentate organic compound coordinated to at least one metal ion, comprising the steps
   a) preparing a dry composition by mixing at least one metal salt corresponding to the at least one metal ion and the at least one at least bidentate organic compound or a salt thereof, wherein the molar ratio of the at least one metal ion and the at least one at least bidentate organic compound is in the range from 10:1 to 1:10;
   b) adding a solvent to the dry composition of step a), wherein the solvent comprises 25 to 75% by volume of at least one alcohol and 25 to 75% by volume of water, wherein the given amounts are based on the total volume of the solvent; and
   c) mixing the solvent-containing composition of step b) to obtain the metal-organic framework in the form of a homogenous powder, wherein the solvent-containing composition has a solid content in the range from 30 to 80% by weight, based on the total weight of the solvent-containing composition.

2. The process according to claim 1, wherein the mixing in step c) is carried out pressureless.

3. The process according to claim 1, wherein the solvent comprises 45 to 55% by volume of the at least one alcohol and 45 to 55% by volume of water, wherein the given amounts are based on the total volume of the solvent.

4. The process according to claim 1, wherein the at least one alcohol is methanol, ethanol, isopropanol, n-propanol or a mixture of two or more thereof.

5. The process according to claim 1, wherein the at least one alcohol is ethanol.

6. The process according to claim 1, wherein the solvent-containing composition of step b) comprises 30 to 80% by weight of the dry composition and 20 to 70% by weight of the solvent, wherein the given amounts are based on the total weight of the solvent-containing composition.

7. The process according to claim 1, wherein the at least one metal ion is an ion of Zn, Al, Mg, Cu, Mn, Fe, Co, Ni, Ti, Zr, Y, Sc, V, In, Ca, Cr, Mo, W, or Ln.

8. The process according to claim 1, wherein the at least one metal ion is an ion of Cu, Zn, or Al.

9. The process according to claim 1, wherein the at least one at least bidentate organic compound is derived from a di-, tri- or tetracarboxylic acid or a monocyclic, bicyclic or polycyclic ring system which is derived from at least one heterocycle selected from the group consisting of pyrrole, alpha-pyridone and gamma-pyridone.

10. The process according to claim 1, wherein the at least one at least bidentate organic compound is a di-, or tricarboxylic acid or substituted or unsubstituted imidazole.

11. The process according to claim 1, wherein the metal-organic framework is Mg-formate, Cu-1,3,5-benzenetricarboxylate, Zn-2-methylimidazolate, Al-fumarate or Al-terephthalate.

12. The process according to claim 1, wherein the molar ratio of the at least one metal ion and the at least one at least bidentate organic compound is from 5:1 to 1:5.

13. The process according to claim 1, wherein the at least one metal ion and the at least one at least bidentate organic compound are used in stoichiometric amounts.

14. A process for the preparation of shaped bodies, comprising the steps
   d) preparation of the metal-organic framework according to claim 1,
   e) molding the metal organic framework into shaped bodies.

15. The process according to claim 14, wherein no further steps are carried out between step d) and step e).

16. The process according to claim 1, wherein the at least one metal ion is an ion of Cu, Zn, Al, Mg, Zr and Fe.

* * * * *